(12) United States Patent
Burowski et al.

(10) Patent No.: US 12,543,144 B2
(45) Date of Patent: Feb. 3, 2026

(54) RANKING WIRELESS STREAMING DEVICES BASED ON PROXIMITY

(71) Applicant: Apple Inc., Cupertino, CA (US)

(72) Inventors: Yagil Burowski, Sunnyvale, CA (US); Robert W. Brumley, San Jose, CA (US); Charles W. Duyk, San Francisco, CA (US); Ron Eyal, Herzliya (IL); Yunxing Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 18/096,803

(22) Filed: Jan. 13, 2023

(65) Prior Publication Data
US 2023/0397154 A1 Dec. 7, 2023

Related U.S. Application Data

(60) Provisional application No. 63/365,855, filed on Jun. 3, 2022.

(51) Int. Cl.
| | |
|---|---|
| *H04W 4/02* | (2018.01) |
| *G01S 5/02* | (2010.01) |
| *G06F 3/04817* | (2022.01) |
| *G06F 3/0482* | (2013.01) |
| *H04W 64/00* | (2009.01) |

(52) U.S. Cl.
CPC ...... *H04W 64/006* (2013.01); *G06F 3/04817* (2013.01); *G06F 3/0482* (2013.01)

(58) Field of Classification Search
CPC .............. H04W 64/006; G06F 3/04817; G06F 3/0482; H04N 21/43615; H04N 21/25841; H04N 21/4122; H04N 21/44227; H04N 21/4524
USPC ........................................................ 455/456.1
See application file for complete search history.

(56) References Cited

U.S. PATENT DOCUMENTS

| | | | |
|---|---|---|---|
| 2015/0248144 A1* | 9/2015 | Hong | G06F 1/3265 361/679.27 |
| 2016/0299669 A1* | 10/2016 | Bates | H04N 21/2387 |
| 2018/0335903 A1* | 11/2018 | Coffman | G06F 3/04847 |

(Continued)

OTHER PUBLICATIONS

IP.com search history (Year: 2024).*

(Continued)

*Primary Examiner* — Moustapha Diaby
(74) *Attorney, Agent, or Firm* — Kilpatrick Townsend & Stockton LLP

(57) ABSTRACT

In some implementations, the device may include conducting ranging with one or more playback devices to determine ranging information between the mobile device and each of the one or more playback devices, where the one or more playback devices are configured to play the streaming data when received from the mobile device, and where the ranging information provides at least one of a distance and an orientation between the mobile device and each of the one or more playback devices. In addition, the device may include detecting a selection of a media item. Also, the device may include identifying a particular playback device from the one or more playback devices for playing the selected media item based on the ranging information of the mobile device relative to each of the one or more playback devices.

24 Claims, 13 Drawing Sheets

(56) References Cited

U.S. PATENT DOCUMENTS

| | | | |
|---|---|---|---|
| 2020/0106877 A1 | 4/2020 | Ledvina et al. | |
| 2020/0137176 A1 | 4/2020 | Todd et al. | |
| 2020/0221366 A1* | 7/2020 | Palmer | H04N 21/43615 |
| 2020/0359170 A1 | 11/2020 | Werner et al. | |
| 2022/0286356 A1* | 9/2022 | Shoesmith | H04W 84/12 |
| 2023/0171298 A1* | 6/2023 | Russell | H04N 21/26208 709/231 |

OTHER PUBLICATIONS

ProQuest search history (Year: 2024).*
IP.com search history (Year: 2025).*
International Search Report and Written Opinion issued in PCT Application No. PCT/US2023/022417, dated Jul. 7, 2023 in 15 pages.
International Preliminary Report on Patentability issued in PCT Application No. PCT/US2023/022417, dated Dec. 12, 2024 in 9 pages.
First Examination Report issued in Australia Application No. AU2023279619, dated Aug. 11, 2025 in 3 pages.

* cited by examiner

RANKING WIRELESS STREAMING DEVICES BASED ON PROXIMITY

CROSS-REFERENCES TO RELATED APPLICATIONS

This application claims the benefit to U.S. Provisional Application No. 63/365,855, filed Jun. 3, 2022, entitled "Ranking Wireless Streaming Devices Based On Proximity," the disclosure which is incorporated by reference in its entirety and for all purposes.

BACKGROUND

Wireless protocols can be used for streaming media content to a nearby device (e.g., a smart speaker, an AppleTV, a smartTV) from a mobile computing device (e.g., a smartphone). A wireless streaming protocol (e.g., AirPlay) technology allows for sending audio, video, or screen data from a mobile device (e.g., an Apple device) to any device (e.g., first party or third party) that implements the wireless streaming protocol that can be licensed. Applications that support the wireless streaming protocol can generate lists (e.g., a picker list) that can provide clarity to a user on which media devices would be the most relevant for streaming media to the user at the moment. The lists can be a flat list, ordered alphabetically. As the wireless streaming protocol has grown in popularity, endpoint proliferation can present problems as almost every new smartTV, smartdevice (e.g., a smartspeaker) can support wireless streaming protocol and it can be challenging to determine which device is the most appropriate at the moment to stream the media content (of multiple potential devices). For example, a user may be sitting within a few meters of a smartTV that is wireless streaming compatible and it would be beneficial to the user if the specific smartTV is listed first for streaming content.

BRIEF SUMMARY

Certain embodiments of the present invention can provide methods, systems, and apparatuses for determining relevant media devices to include on a list of media devices to stream media content. If ultrawide band (UWB) ranging is available, the mobile device can conduct ranging with the one or more media devices to determine which devices are closest in range to the mobile device. If UWB ranging is not available, the mobile device can use received signal strength indication (RSSI) from either Bluetooth advertising signals or Wi-Fi signals to determine whether or not the mobile device is within certain cluster locations. The mobile device can also use the orientation of the mobile device (e.g., determining whether the device is pointing at a particular media device) for identifying a relevant media device to include on the list of relevant media devices. The mobile device can also conduct ranging with a third device (e.g., another mobile device) to determine a location of the mobile device relative to the one or more media devices.

In various embodiments, the mobile device can use UWB ranging, RSSI determination, and orientation of the mobile device to determine whether or not the media device should even be included in the list of relevant media device.

In various aspects, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method can include conducting ranging with one or more playback devices to determine ranging information between the mobile device and each of the one or more playback devices. The one or more playback devices can be configured to play the streaming data when received from the mobile device. The ranging information can provide at least one of a distance and an orientation between the mobile device and each of the one or more playback devices. The method can include detecting a selection of a media item. The method can include identifying a particular playback device from the one or more playback devices for playing the selected media item based on the ranging information of the mobile device relative to each of the one or more playback devices. Other embodiments of this aspect include corresponding computer systems, apparatus, and computer programs recorded on one or more computer storage devices, each configured to perform the actions of the methods.

Implementations may include one or more of the following features. The method can include measuring one or more sensor values at one or more times. The one or more sensor values can be measured using one or more sensors of the mobile device. The one or more sensor values can be determined from one or more signals emitted by a corresponding one or more signal sources. The method can include determining a relative position of the mobile device with respect to the one or more playback devices based on the one or more sensor values. The method can include identifying a particular playback device from the one or more playback devices in a list for playing the selected media item based on the relative position of the mobile device relative to the one or more playback devices. The one or more signal sources can include the one or more playback devices.

The method of determining the relative position of the mobile device with respect to the one or more playback devices may include generating a heat map of the one or more signals at a location. The heat map can identify positions of the one or more playback devices at the location. The method can include determining a plurality of clusters at the location based on the heat map. Each cluster can be physically apart at the location. The method can include determining a probability of the mobile device being within one of the plurality of clusters based on a received strength of the one or more signals and the heat map. The method can include determining a probability of detecting a particular signal of the one or more signals over a time period. The method can include determining if the mobile device is within a particular cluster based in part on the probability. The method can include determining an orientation of the mobile device relative to the one or more playback devices. The method can include identifying the particular playback device from the one or more playback devices in a list of the one or more playback devices for playing the selected media item based on the orientation of the mobile device relative to the one or more playback devices. The method can include receiving advertising signals from the one or more playback devices. The advertising signals can provide information regarding communication capabilities of each of the one or more playback devices. The advertising signal can include an authentication tag of a particular playback device of the one or more playback devices. The method can include authenticating the particular playback device based at least in part on the authentication tag. The method can include displaying, on a screen of the mobile device, an icon corresponding to the particular device, where the icon is displayed at a location on the screen based on the one or more ranges or the relative position of the mobile device. The method can include receiving a gesture on a display of the mobile device. The method can include identifying a particular playback device from the one or more playback devices in a list of the one or more playback devices for playing the selected media item based on the received gesture. The method can include routing information to the particular playback device for playing the media item. Implementations of the described techniques may include hardware, a method or process, or a computer tangible medium.

Other embodiments of the invention are directed to systems, apparatus, and computer readable media associated with methods described herein. In one embodiment, the computer readable medium contains instructions for receiving data and analyzing data, but not instructions for directing a machine to create the data. In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

Reference to the remaining portions of the specification, including the drawings and claims, will realize other features and advantages of embodiments of the present invention. Further features and advantages, as well as the structure and operation of various embodiments of the present invention, are described in detail below with respect to the accompanying drawings. In the drawings, like reference numbers can indicate identical or functionally similar elements.

DETAILED DESCRIPTION

Figure 1:
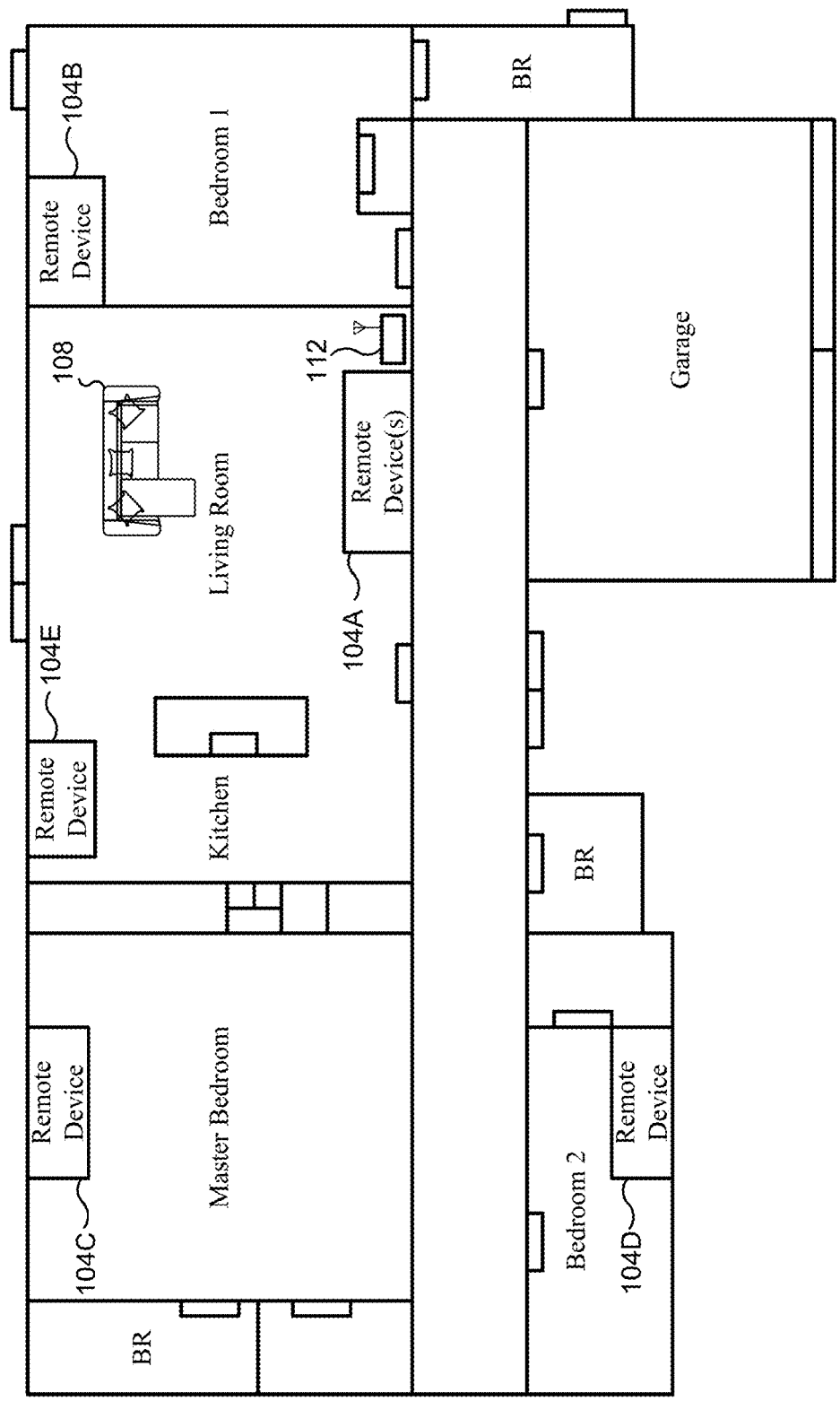
FIG. 1 illustrates and exemplary floorplan of a residence in which predictive routing of a media stream may be used according to aspects of the present disclosure.

Embodiments provide techniques for determining relevant media devices to include on a list of media devices to stream media content. A mobile device can receive a wireless signal (e.g., an advertising packet from Bluetooth signal). The wireless signal can include information describing capabilities of a playback device or an electronic device (e.g., a router) in a room. The mobile device can receive the wireless signal and from information contained within the wireless signal determine one or more capabilities of the other devices (e.g., time-of-flight (TOF) information from ranging techniques (e.g., UWB ranging)). If TOF information is available, the mobile device can conduct ranging with the one or more media devices to determine which devices are closest in range to the mobile device. If TOF information is not available, the mobile device can use received signal strength indication from either Bluetooth advertising signals or Wi-Fi signals to determine whether or not the mobile device is within certain cluster locations. The mobile device can also use the orientation of the mobile device (e.g., determining whether the device is pointing at a particular media device) for identifying a relevant media device to include on the list of relevant media devices. The mobile device can also conduct ranging with a third device (e.g., another mobile device) to determine a location of the mobile device relative to the one or more media devices.

In various embodiments, the mobile device can use UWB ranging, RSSI determination, and orientation of the mobile device to determine whether or not the media device should even be included in the list of relevant media device.

Modern mobile devices are operated to perform a number of different functions. Some of those functions may include playing various types of media (e.g., audio, video, etc.) locally (on the mobile device) or streamed to one or more remote devices (e.g., display devices, televisions, stereos, speakers, etc.). Users frequently have a plurality of such remote devices in their homes. Aspects of the present disclosure enable predicting a particular remote device of the plurality of remote devices to which a user intends to route a media stream based on the microlocation of the mobile device and historical usage of the mobile device. In some instances, the media may be automatically routed to the predicated device (as soon as the user requests playback of the media). In other instances, the user may be presented with one or more predicted remote devices and prompted to select a particular remote device. In still yet other instances, a shortcut may be generated on the mobile device allowing the mobile device to predict media that a user will want to play, predict a remote device that the user intends to receive the predicted media, and automatically connect to the remote device and initiate streaming of the predicted media to the remote device. In some instances, the predicted destination device for routing the media stream may be the local device.

I. Routing of Media Streams to Devices

Electronic devices (e.g., media playback devices) can have different capabilities. For example, some of the devices can be equipped with TOF capabilities (e.g., UWB ranging) to conduct ranging with other electronic devices. The electronic devices can transmit wireless signals that can advertise the capabilities of the electronic device. TOF capabilities can be preferred for precisely locating an electronic device in a room. If TOF capabilities are not available, other techniques (e.g., measuring RSSI, determining orientation of the mobile device) can be used to determine relevant playback devices in a room.

FIG. 1 illustrates and exemplary layout of a residence in which predictive routing of a media stream may be used according to aspects of the present disclosure. Modern homes frequently include multiple disparate types of remote devices 104A-104E configured to play or stream media (e.g., televisions, stereos, Bluetooth devices, speakers, etc.). For instances, a residence may include a television (e.g., 104A) in a living room, another television (e.g., 104E) in the kitchen 104E, and one or more device configured to play media (e.g., computers, stereos, televisions, etc.) 104B-104D in each bedroom. Users may operate more than one remote device within the residence to stream media. For instance, a user may stream a television show using the living room television (e.g., 104A) in the afternoon and continuing streaming using a different a bedroom television (e.g., 104C) in the evening.

Embodiments can define a microlocation as a defined position of the mobile device as measured using sensor values determined relative to one or more fixed signal sources. The microlocations and past routing selections can be used to determine a probable remote device to stream the particular media. In some instances, such as when probability is high (e.g., calculated as greater than 80%), streaming media to the remote device may be automatically initiated by the remote device. For example, if the mobile device always selects the living room television to stream media when the mobile device is located on couch 108 of the living room in the evening there may be a high probability that the user will select the living room television if the mobile device is located on couch 108. In various embodiments, the mobile device may automatically select the living room television under these circumstances.

In other instances, such as when the probability is medium (e.g., calculated between 50% and 80%), a list of probable devices may be presented to the user for selection. For example, if the mobile device has a microlocation near two remote devices (e.g., 104A and 104E) and the mobile device uses each device 50% of the time, the probability of either device being the user's intended device for media streaming may not be high enough to trigger automatic routing of the media stream to a particular remote device. The mobile device may present the user with a graphical user interface option enabling the user to select the particular remote device intended for media streaming. In some instances, only those devices that have a medium probability may be shown to the user to make selection easier (and devices that fall below the medium threshold may be omitted from the list). In other instances, the user may be presented with a third option that once selected, presents all possible remote devices in the residence for selection for media streaming.

The location of the mobile device may be determined using one or more sensors of the mobile device. For example, the mobile device may detect signals emitted from one or more fixed signal sources such as a router 112, a remote device 104A-E, a Bluetooth device, and/or the like). One or more properties (e.g., data packet, signal strength, etc.) of each received signal may be used to provide a relative position of the mobile device to the one or more fixed signal sources (despite not knowing the layout of the structure).

A brief review of ranging and triangulation techniques follows below.

II. Ranging/Triangulation Techniques

A mobile device or smart speaker can include circuitry for performing ranging measurements. Such circuitry can include one or more dedicated antennas (e.g., three antennas) and circuitry for processing measured signals. The ranging measurements can be performed using the time-of-flight of pulses between the mobile device and the smart speaker. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

Figure 2:
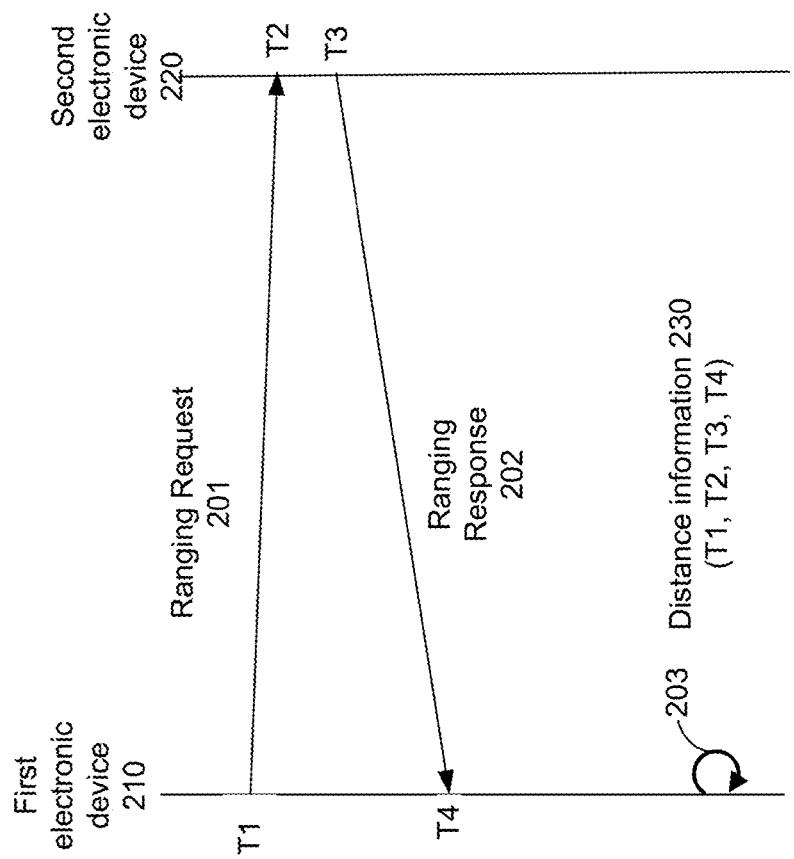
FIG. 2 shows a sequence diagram for performing a ranging measurement between an electronic device and a mobile device according to embodiments of the present disclosure.

FIG. 2 shows a sequence diagram 200 for performing a ranging measurement between an electronic device and a mobile device according to embodiments of the present disclosure. The electronic device and the mobile device may belong to two different users. In various embodiments, the mobile device 210 can be an electronic device (e.g., a smart speaker, a smart TV, a smart appliance, etc.). In various embodiments, the electronic device and the mobile device can be electronically linked through a pairing process. As described in more detail later, such an identifier can be used for authentication purposes, e.g., so ranging is not performed with unknown devices. Although FIG. 2 shows a single measurement, the process can be repeated to perform multiple measurements over a time interval as part of a ranging session, where such measurements can be averaged or otherwise analyzed to provide a single distance value, e.g., for each antenna.

In various embodiments, a more complex exchange can be used. For example, the electronic device can send out a polling message and open up a plurality of response time slots. Inside each response time slot there can be one, two, or three packet exchanges. The additional packet exchanges can correct for ranging errors (e.g., differential clock rates, multipath propagation) in order to generate more accurate relative position (distance/angle).

A first electronic device 210 (e.g., a smart speaker, a smart TV, a smart appliance, etc.) can initiate a ranging measurement (operation) by transmitting a ranging request 201 to a second electronic device 220 (e.g., a mobile device). Ranging request 201 can include a first set of one or more pulses. The ranging measurement can be performed using a ranging wireless protocol (e.g., ultra-wideband (UWB)). The ranging measurement may be triggered in various ways, e.g., based on user input and/or authentication using another wireless protocol, e.g., Bluetooth Low Energy (BLE).

At $T_1$, the first electronic device 210 transmits ranging request 201. At $T_2$, the second electronic device 220 receives ranging request 201. $T_2$ can be an average received time when multiple pulses are in the first set. The second electronic device 220 can be expecting the ranging request 201 within a time window based on previous communications, e.g., using another wireless protocol. The ranging wireless protocol and the another wireless protocol can be synchronized so that second electronic device 220 can turn on the ranging antenna(s) and associated circuitry for a specified time window, as opposed to leaving them on for an entire ranging session.

In response to receiving the ranging request 201, second electronic device 220 can transmit ranging response 202. As shown, ranging response 202 is transmitted at time $T_3$, e.g., a transmitted time of a pulse or an average transmission time for a set of pulses. $T_2$ and $T_3$ may also be a set of times for respective pulses. Ranging response 202 can include times $T_2$ and $T_3$ so that the first electronic device 210 can compute distance information. As an alternative, a delta between the two times (e.g., $T_3-T_2$) can be sent. The ranging response 202 can also include an identifier for the first electronic device 210, an identifier for the second electronic device 220, or both.

At $T_4$, the first electronic device 210 can receive ranging response 202. Like the other times, $T_4$ can be a single time value or a set of time values.

At 203, the first electronic device 210 computes distance information 230, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal $T_2-T_1+T_4-T_3$. In some embodiments, the processing time for the second electronic device 220 can also be subtracted from the total round-trip time. More complex calculations can also be performed, e.g., when the times correspond to sets of times for sets of pulses and when a frequency correction is implemented. Also, additional packet exchanges can be included to correct for ranging errors such as difference between device clock frequencies.

However, ranging may not be required and may be difficult in certain applications. As the number of participating devices increases the complexity of the ranging sessions also increases due to potential of collisions between ranging packets in the same frequency band. In addition, other ranging techniques can be complicated when one or more mobile devices enter or leave the communication session. In addition, multiple beacons can be used for precise position location of mobile devices with the receiving devices in a passive receive only mode.

Figure 3:
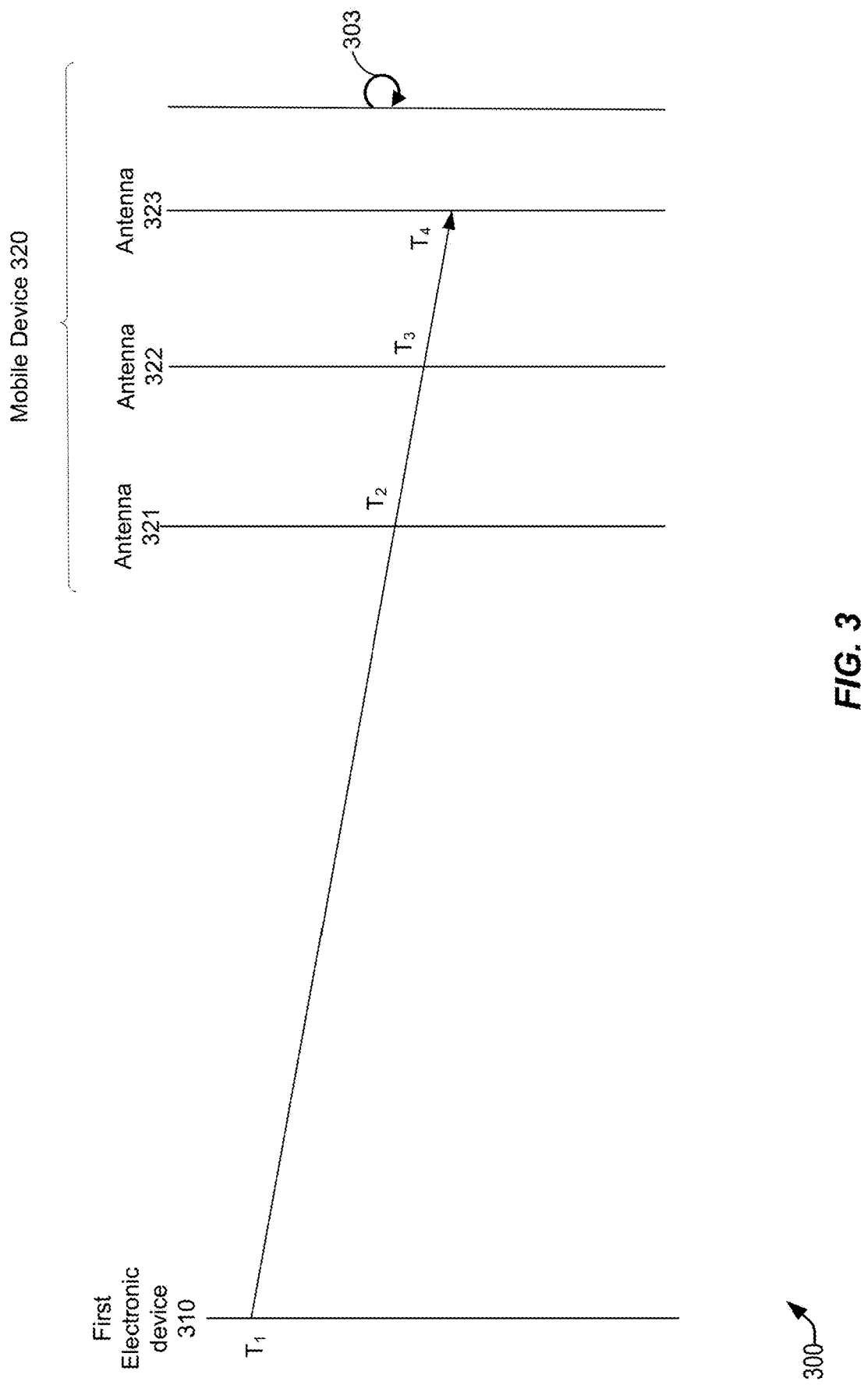
FIG. 3 illustrates a sequence diagram involving a first electronic device (e.g., a smart speaker, a smart TV, a smart appliance, etc.) and a mobile device with a multiple-antenna array.

FIG. 3 shows a sequence diagram 300 of a ranging operation involving a first electronic device 310 (e.g., a smart speaker, a smart TV, a smart appliance, etc.) and a mobile device 320 having three antennas 321, 322, and 323 according to embodiments of the present disclosure. Antennas 321, 322, 323 can be arranged to have different orientations, e.g., to define a field of view for calculating angle of arrival or for performing ranging measurements.

In this example of FIG. 3, each of antennas 321, 322, 323 receives a packet (including one or more pulses) that is transmitted by the first electronic device 310 (e.g., a smart speaker, a smart TV, a smart appliance, etc.). These packets can transfer information to the mobile device 320 such as links to information or ranging requests. The link can be received by the mobile device. The reception of the packets can trigger one or more actions on the mobile device 320. The actions can include initiating a handoff or enabling a user interface on the mobile device 320. The handoff can refer to the process of transferring ongoing call or data connectivity from one device to another device.

Mobile device 320 can have multiple antennas, which can be used to determine angular information related to an orientation of mobile device 320 relative to first electronic device 310. The packets can be received at times $T_1$, $T_3$, and $T_4$, by antennas 321, 322, and 323 respectively. Thus, the antenna(s) (e.g., UWB antennas) of mobile device 320 can listen at substantially the same time. In various embodiments, each of the antennas 321, 322, and 323 can respond independently.

Processor 324 of mobile device 320 can calculate an angle of arrival to the first electronic device 310. Processor 324 can receive, at 303, the time of arrival of the packets from the antennas 321, 322, and 323. The mobile device 320 circuitry (e.g., UWB circuitry) can analyze the received signals from antennas 321, 322, 323. As described later, processor 324 can be an always-on processor that uses less power than an application processor that can perform functionality that is more general. The processor 324 can know the geometry of the three antennas on the phone. The processor 324 can also know the orientation of the mobile device 320 from one or more sensors on the mobile device 320 (e.g., accelerometer, gyroscope, and compass). With the known orientation of the antennas 321, 322, and 323, and the known orientation of the mobile device 320, the processor can use the times of arrival $T_2$, $T_3$, and $T_4$ to calculate an angle of arrive of the packet to the beacon device 310.

Accordingly, a mobile device can have multiple antennas to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian or polar, where polar coordinates can comprise an angular value and a radial value.

B. Low Energy Protocols

A passive beacon can transmit a timing signal via a wireless protocol (e.g., Bluetooth Low Energy (BLE) advertising). One of the advantages of BLE is lower power consumption even when compared to other low power technologies. BLE achieves the optimized and low power consumption by keeping the radio off as much as possible and sending small amounts of data at low transfer speeds. Another advantage of BLE is that it is enabled in most smartphones in the market.

In the advertising state, a device sends out packets containing useful data for others to receive and process. The packets are sent at an interval defined as the Advertising Interval. The interval can be random or pseudo-random. There are 40 radio frequency channels in BLE, each separated by 2 MHz (center-to-center). Three of these channels are called the Primary Advertising Channels, while the remaining 37 channels are used for Secondary Advertisements and for data packet transfer during a connection. Advertisements can start with advertisement packets sent on the three Primary Advertising Channels (or a subset of these channels). This allows centrals to find the Advertising device (Peripheral or Broadcaster) and parse its advertising packets. The central can then initiate a connection if the advertiser allows it (e.g., peripheral devices).

C. Ultra-Wideband Packet Transmissions

Ultra-Wide Band (UWB) transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 megahertz (MHz). Bluetooth defines two transmissions types: data and advertising transmissions. As such, three of these 40 channels are dedicated to advertising and 37 dedicated to data. Advertising allows devices to broadcast information defining their intentions.

The UWB information packets can be structured to transmit at a specific time relative to the transmitting device's BLE advertisements. Accordingly, the receiving device can listen for the UWB packets at an expected time or during an expected time window around the expected time. The UWB packets can convey transmitting device information, deep links, and/or transmission time information. The receiver device can use the time in the BLE advertising message to determine when to listen for the next poll. The UWB packets can be transmitted in the UWB frequency range.

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by Institute of Electrical Electronics and Engineers (IEEE) 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests can correspond to stage 1, and ranging responses can correspond to stage 2. Such use of an indicator may be helpful when more than two devices are performing ranging operations in near each other.

The narrow pulses (e.g., ~one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

Mobile devices may use Global Navigation Satellite Systems (GNSS) (e.g., Global Positioning System (GPS)) or other location circuitry to determine the location of the mobile device. For example, a map application can show an approximate location of the mobile device on a map. However, such techniques for determining location are typically determined relative to some external reference frame that is fixed, and not to a variable reference frame, e.g., another mobile device. Additionally, GNSS systems can be limited indoors or in areas of blocked signals (e.g., dense urban environments) or suffer from inaccuracies from reflected signals. Further the standard accuracy for GPS systems is currently 4 meters for horizontal accuracy and worse for vertical accuracy. Enhanced communication techniques can allow for information exchanges that allow for angular determination, ranging, and information exchanges between electronic devices.

Figure 4:
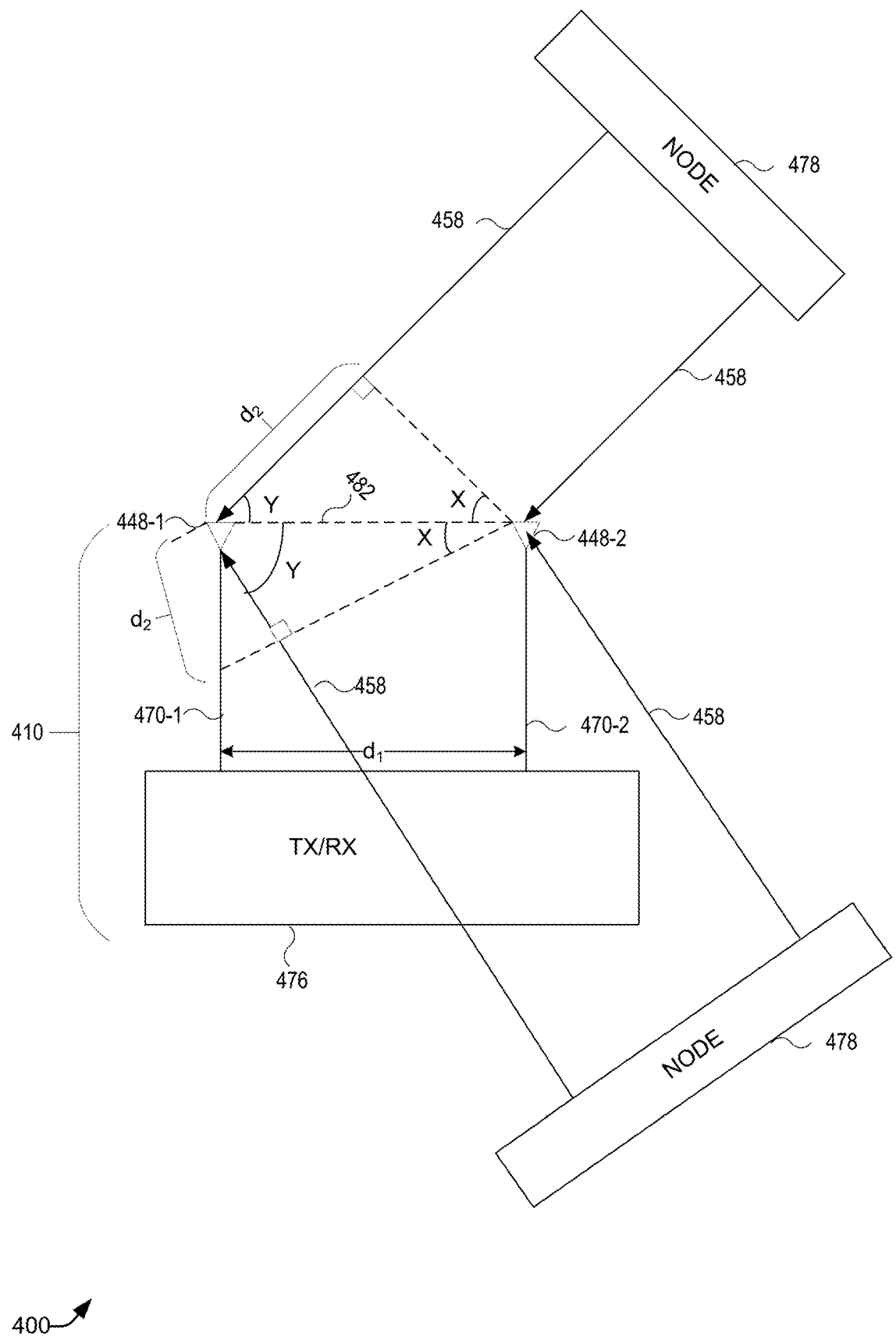
FIG. 4 illustrates a communication technique for determining an angle of arrival.

FIG. 4 is a schematic diagram 400 showing how angle of arrival measurement techniques may be used to determine the orientation of device 410 relative to nodes 478. The angle of arrival information can be used to trigger one or more features for the electronic device. For example, a user interface can be generated for controlling the electronic device if the mobile device is pointed at the electronic device. The term "node" may be used to refer to an electronic device, an object without electronics, and/or a particular location. In some arrangements, nodes may be associated with a mapped environment (e.g., the term node may refer to a device, object, or location in a mapped environment). Devices 410 may have control circuitry that determines where other nodes are located relative to device 410. The control circuitry in device 410 may synthesize information from cameras, motion sensors, wireless circuitry such as antennas, and other input-output circuitry to determine how far a node is relative to device 410 and/or to determine the orientation of device 410 relative to that node. The control circuitry may use output components in device 410 to provide output (e.g., display output, audio output, haptic output, or other suitable output) to a user of device 410 based on the position of the node. The control circuitry may, for example, use antenna signals and motion data to determine the angle of arrival of signals from other electronic devices to thereby determine the locations of those electronic devices relative to the user's electronic device.

As shown in FIG. 4, electronic device 410 may include multiple antennas (e.g., a first antenna 448-1 and a second antenna 448-2) coupled to transceiver circuitry 476 by respective transmission lines 470 (e.g., a first transmission line 470-1 and a second transmission line 470-2). Antennas 448-1 and 448-2 may each receive a wireless signal 458 from node 478. Antennas 448-1 and 448-2 may be laterally separated by a distance $d_1$, where antenna 448-1 is farther away from node 478 than 448-2 (in the example of FIG. 4). Therefore, wireless communications signal 458 travels a greater distance to reach antenna 448-1 than 448-2. The additional distance between node 478 and antenna 448-1 is shown in FIG. 4 as distance $d_2$. FIG. 4 also shows angles x and y (where x+y=90°).

Distance $d_2$ may be determined as a function of angle γ or angle x (e.g., $d_2=d_1 \sin(x)$ or $d_2=d_1 \cos(y)$). Distance $d_2$ may also be determined as a function of the phase difference between the signal received by antenna 448-1 and the signal received by antenna 448-2 (e.g., $d_2=(\Delta\phi\lambda)/(2\pi)$, where $\Delta\phi$ is the phase difference between the signal received by antenna 448-1 and the signal received by antenna 448-2 and λ is the wavelength of the received signal 458). Electronic device 410 may have phase measurement circuitry coupled to each antenna to measure the phase of the received signals and identify a difference in the phases (Δφ). The two equations for $d_2$ may be set equal to each other (e.g., $d_1 \sin(x)=(\Delta\phi\lambda)/(2\pi)$ and rearranged to solve for angle x (e.g., $x=\sin(x)-1(\Delta\phi\lambda)/(2\pi d_1)$) or may be rearranged to solve for angle γ. As such, the angle of arrival may be determined (e.g., by control circuitry) based on the known (predetermined) distance between antennas 448-1 and 448-2, the detected (measured) phase difference between the signal received by antenna 448-1 and the signal received by antenna 448-2, and the known wavelength or frequency of the received signals 458.

Distance $d_1$ may be selected to ease the calculation for phase difference between the signal received by antenna 448-1 and the signal received by antenna 448-2. For example, $d_1$ may be less than or equal to one-half of the wavelength (e.g., effective wavelength) of the received signal 458 (e.g., to avoid multiple phase difference solutions).

Some antenna arrangements may be sufficient for resolving the "complete" angle of arrival of signals 458 without ambiguity. A complete angle of arrival (sometimes referred to as the direction of arrival) includes an azimuth angle θ and an elevation angle γ of node 478 relative to device 1300.

Antennas that are located in a three-dimensional arrangement (e.g., spanning multiple planes) may be sufficient to determine the complete angle of arrival of signals 458 without ambiguity. However, when the baseline vectors (i.e., the vectors that extend between respective pairs of antennas) are all located in one plane, there may be some ambiguity as to the correct azimuth angle θ and/or the correct elevation angle γ of signals 458. In the two-antenna arrangement of FIG. 4, for example, there is only one baseline vector 482, which yields an accurate, unambiguous azimuth angle θ, but may not provide sufficient information to determine elevation angle φ. Thus, node 478' with a different elevation angle may nonetheless produce signals 458' with the same phase difference Δφ between the signal received by antenna 448-1 and the signal received by antenna 448-2 as signals 458. In other words, different directions of arrival may result in the same phase difference. This leads to an ambiguity in the angle of arrival solution. Without other information, control circuitry may be able to determine the azimuth angle θ of signals 458 but may be unable to determine elevation angle γ of signals 458. Systems with three or more coplanar antennas will resolve some but not all ambiguities in the angle of arrival because the baseline vectors will still be located in the same plane.

To help resolve ambiguities in the complete angle of arrival, control circuitry may combine antenna signals with motion data gathered using motion sensor circuitry. In particular, control circuitry may obtain angle of arrival measurements (e.g., measurements of azimuth angle θ and/or elevation angle φ) while device 410 is in multiple different positions. At each position, antennas 448 may receive signals 458 from node 478 and control circuitry may determine the possible angle of arrival solutions based on the phase difference between signals received by antenna 448-1 and signals received by antenna 448-2. Motion sensor circuitry may track the movement of device 410 as it is moved from one position to another. Using the motion data from motion sensor circuitry, control circuitry may associate each set of angle of arrival solutions with a different baseline vector 482. The baseline vectors may span multiple planes, thus providing sufficient information for control circuitry to determine the correct angle of arrival, just as if device 410 had a multi-planar antenna arrangement.

It should be understood that using a horizontal coordinate system and representing the complete angle of arrival with azimuth and elevation angles is merely illustrative. If desired, a Cartesian coordinate system may be used and the angle of arrival may be expressed using a unit direction vector that is represented using x, y, and z coordinates. Other coordinate systems may also be used. A horizontal coordinate system is sometimes described herein as an illustrative example.

III. Sensor Measurements and Clusters

A microlocation can be a location that is determined relative to one or more fixed locations using one or more sensors of the mobile device. For example, one or more sensor measurements may be used to determine the mobile device's position relative to one or more signal sources despite the mobile device lacking details corresponding to the environment. While the mobile device may not determine a precise geographical location, the device may determine a relative location within a residence or building. In some instances, the microlocation may be correlated with the layout of the residence or building to identify a geographical location (e.g., a position within a particular room of the residence or building). Microlocations include locations within a physical space and/or a sensor space (e.g., indicating the position of the mobile device relative to one or more fixed, but unknown, sources). For example, a microlocation in sensor space may indicate that the mobile device is three feet in a particular direction from a radio signal source (e.g., represented as a vector). While the physical location of the mobile device may be unknown, the relative sensor measurements of multiple signals may be used to define a relative mobile device position within a building.

Sensor measurements can be obtained continuously or in response to a triggering event. For instance, the mobile device may detect a button press (e.g., triggering event) and causes the mobile device to measure signals (e.g., Wi-Fi or Bluetooth, etc.) emitted from one or more signal sources, e.g., electronic devices, such as a wireless router, a Wi-Fi equipped appliance (e.g., set top box, smart home device), or a Bluetooth device. The detected signals may be used to generate a multi-dimensional data point of sensor values in sensor space, where each dimension in sensor space can correspond to a property of a signal emitted from a signal source. The multi-dimensional data point may represent the microlocation of the mobile device in sensor space, where the microlocation corresponds to the physical position of the mobile device in physical space.

Figure 5A:
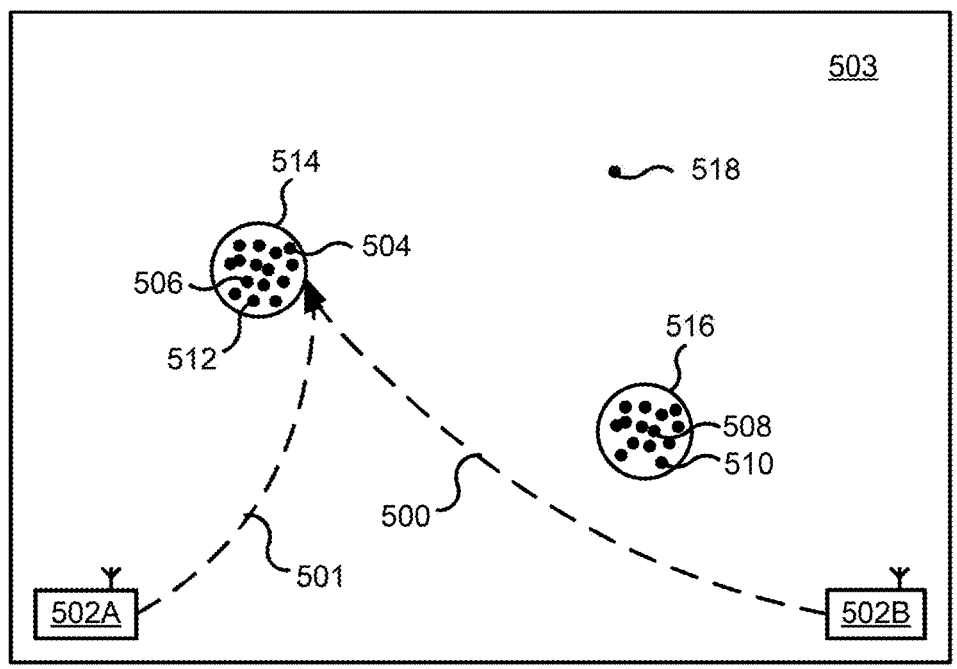
FIG. 5A is a simplified diagram illustrating clusters of physical positions in physical space according to aspects of the present disclosure.

FIG. 5A is a simplified diagram illustrating a plurality of physical positions in physical space 503. As examples, physical space 503 can be the interior of a home, an office, a store, or other building. Physical space 503 may include a plurality of signal sources, such as signal sources 502A and 502B. Each signal source can emit wireless communication signals, as are emitted from a wireless router or a Bluetooth device. A signal source can be considered a stationary device, as their position does not typically change.

A mobile device may be located within physical space 503 such that one or more signals emitted from signal sources 502A and 502B are detected. For example, the mobile device may be located at physical position 504 in FIG. 5A, where signals 501 and 500 are detected from signal sources 502A and 502B, respectively. It is to be appreciated that the mobile device may only measure one of signals 501 and 500 at some positions, e.g., due to signal degradation at certain positions. In some instances, the mobile device may detect signals from external signal sources (not shown) (e.g., outside the physical space 503). While only two signal sources (502A and 502B) are depicted mobile devices may receive (or detect) signals from any number of signal sources (within or external to the physical space).

In many instances, a user may operate a mobile device in some physical locations more often than other physical locations. For example, a user may use a mobile device more often when the user is on a couch than when the user is in the kitchen. These physical locations may be define a cluster location (e.g. a set of one or more physical positions that are spatially near each other), such as clusters 514 and 516 of physical positions. Each cluster may have a group of physical positions that are located close together. As an example, cluster 514 may include physical positions 504, 506, and 512. As shown, cluster 516 includes physical positions 508 and 510. According to embodiments, the mobile device may be configured to determine when the mobile device is in one of these clusters based on the detected signals (e.g., signals 500, 501, and/or other signals not shown). In some instances, the mobile device may use the cluster to predict a particular device in which to stream media.

In other instances, clusters may be used to determine a location of a mobile device with a threshold accuracy. For example, a number of positions of the mobile may be obtained over a predetermined time interval. The quantity of positions and relative proximity of the positions relative to each other may be used to determine the location of the device with a given level of accuracy being based on the quantity of positions and the density of the positions. The greater the quantity of positions detected with a particular density, the greater the probability that the mobile device's location is correct. One or more thresholds may be used to determine a particular quantity of positions and the particular density necessary to indicate an accurate location of the mobile device. Thus, clusters may be predefined based on historical data of the mobile device (as described above) to provide a function when the mobile device is located at a predefined cluster and/or clusters may be defined in real-time to define a location of the mobile device with a given level of accuracy.

The mobile device may measure one or more sensor values from signals emitted from signal sources 502A and 502B. For instance, if the mobile device is at physical position 504, the mobile device may measure sensor values from signal 501 emitted from signal source 502A and signal 500 from signal source 502B. The measured sensor values may be signal properties of signal 501 and signal 500. The measured sensor values may be used to define a microlocation in sensor space, as shown in FIG. 5B.

Figure 5B:
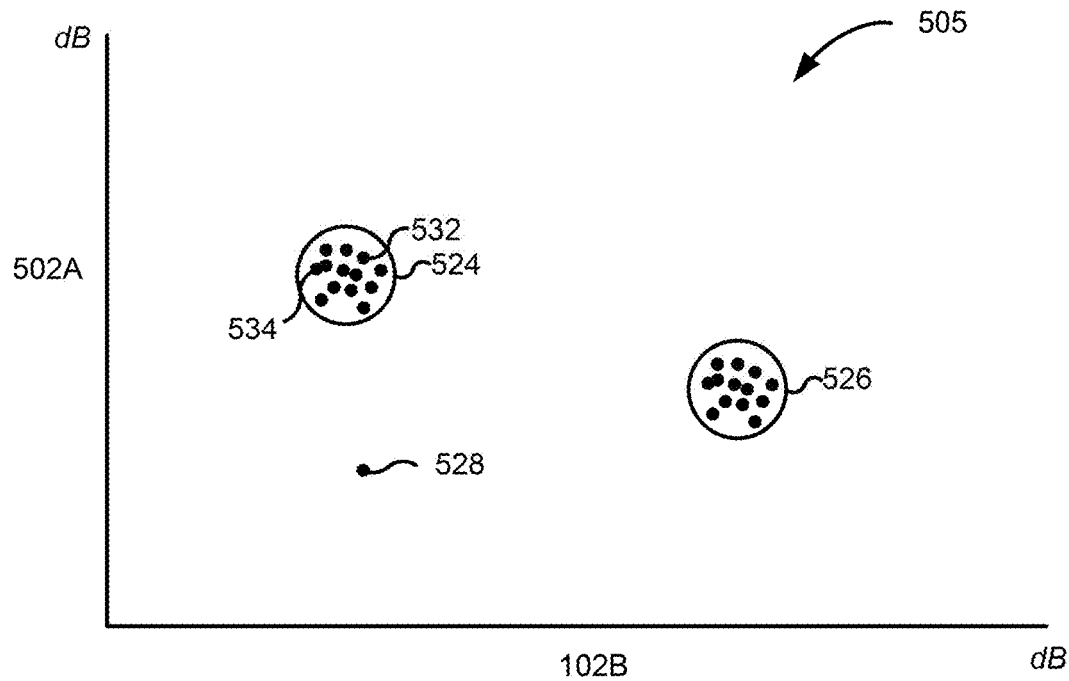
FIG. 5B is a simplified diagram illustrating clusters of sensor positions in sensor space corresponding to the physical positions in physical space of FIG. 1 according to aspects of the present disclosure.

FIG. 5B is a simplified diagram illustrating a plurality of microlocations in sensor space 505, which corresponds to physical space 503. Sensor space 505 is depicted as a plot of measured microlocations in signal strength. The X axis may represent measured values of signals from signal source 502B in dB increasing to the right, and the Y axis may represent measured values of signals from signal source 502A in dB increasing upwards.

The microlocations in sensor space correspond to respective physical positions in physical space 503. For example, measured sensor values at physical position 504 in FIG. 5A corresponds to a microlocation 532 in sensor space shown in FIG. 5B. Microlocation 532 is represented as a two-dimensional data point where one dimension corresponds to a sensor value from signal source 502A and the other dimension corresponds to a sensor value from signal source 502B. Sensor space 505 may include clusters of microlocations, e.g., cluster 524 of microlocations and cluster 526 of microlocations. Clusters 524 and 526 of microlocations correspond with clusters 514 and 516 of physical positions in FIG. 5A, respectively.

Clusters 524 and 526 may be unlabeled locations (e.g., the actual physical coordinates corresponding to clusters 524 and 526 are unknown). It may only be known that there exists a cluster of microlocations that have similar sensor values and that the cluster represents a discrete location in physical space (relative to one or more signals sources). However, the mobile device may perform functions based on microlocations in sensor space such that use of the mobile device in physical space is benefited. For instance, the mobile device may determine a microlocation of the mobile device and automatically route playback of media to a particular remote device based on whether the microlocation is within a cluster in which pattern of media streaming is known.

Accordingly, a microlocation can correspond to a location that is relative to another (fixed) location. For example, a microlocation may be represented as a vector that includes, for each signal source, a distance from the signal source and a direction. Microlocations may be defined from a set (e.g., one or more) of sensor values measured by sensor(s) of a mobile device while the mobile device is located at a physical position in physical space. A sensor value can be a measure of a property of the signal (e.g., signal strength, time-of-flight, or data conveyed in a wireless signal such a data conveyed by a signal source to the mobile device that includes a property of a signal transmitted from the mobile device to the signal source). Each sensor value of a set of sensors values can correspond to a same or different dimension in sensor space, where the set of one or more sensor values forms a data point (e.g., a multi-dimensional data point, also called a feature vector) in the sensor space.

As shown in FIG. 5A, sensor values for microlocations in cluster 514 may be higher for signal source 502A (which is in the vertical axis in FIG. 5B) than the sensor values for microlocations in cluster a second cluster 516 (e.g., where the sensor value is signal strength). This may be due to the physical positions in a first cluster 514 being closer to signal source 502A than physical positions in the second cluster 516 are to signal source 502A. The differences in sensors values between the first cluster 514 and the second cluster 516 may be based on what property the sensor value represents. For instance, for a sensor value that represents a signal property of time-of-flight, the sensor values for the first cluster 514 would be smaller than the sensor values in the second cluster 516.

The microlocation information can determine that a mobile device is likely in a particular cluster like the first cluster 514 or the second cluster 516. The microlocation can use information from other devices in the same cluster. The mobile device can predict what are the other devices in the cluster with the mobile device. If multiple playback devices are in the same cluster, then the orientation information can be used to predict which playback device is closer to the mobile device.

While proximity (via microlocation of the mobile device) was the only factor described above, a plurality of factors may be used to determine a probability for each device. For instance, historical steaming activity of the remote device (e.g., remote device previously streamed media from the mobile device, frequency of media streaming, types of media streamed on the device, time since last streaming session, etc.), time of day, location of remote device within a residence or building, type of remote device, user's historical media consumption, and/or the like may be used in addition to the microlocation of the mobile device.

IV. Sensor Positions and Sensor Clusters

A mobile device may determine a sensor position within a general location. The sensor position may be a position in space represented by sensor values measured from wireless signals emitted from signal sources. When many sensor positions are recorded, the mobile device may recognize a distribution of sensor positions that form a cluster location (or simply a "cluster") represented by groups of sensor positions that include similar sensor values. The clusters of sensor positions may be used to define a microlocation of the mobile device and predict routing of a media stream to a particular remote device.

Figure 6A:
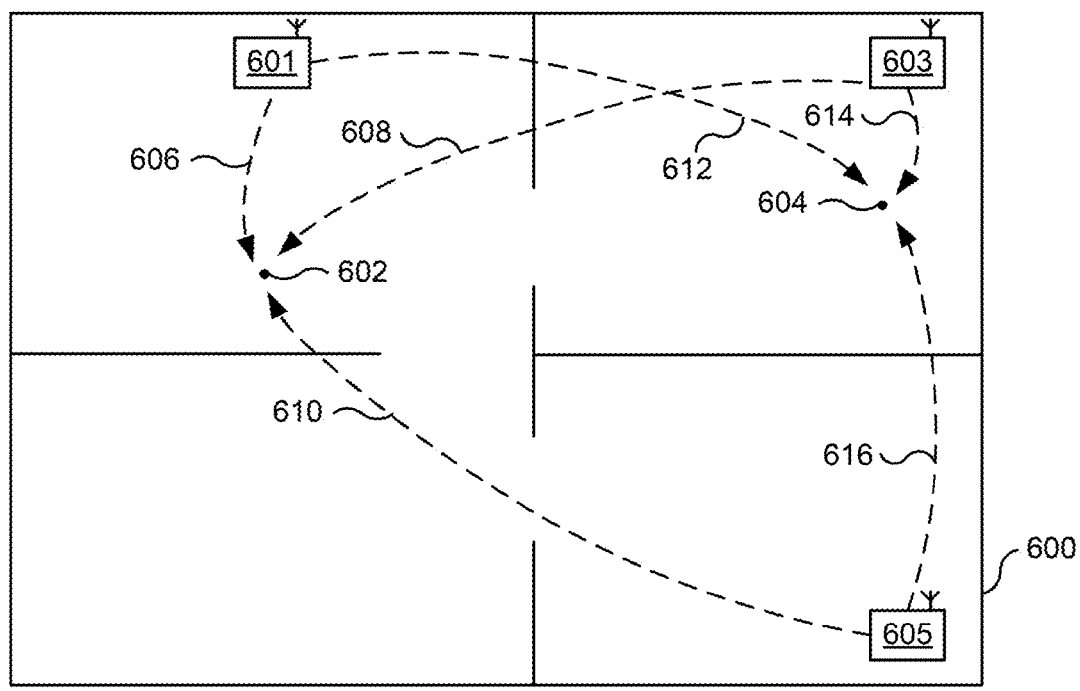
FIG. 6A is a simplified diagram illustrating measurement of sensor positions in a floor plan according to aspects of the present disclosure.

FIG. 6A is a simplified diagram illustrating an exemplary floor plan 600 within which sensor positions are measured. One or more signal sources 601, 603, and 605 may be positioned within floor plan 600. Each signal source may be a device configured to emit wireless signals. For example, a signal source may be an access point such as a wireless router, a Bluetooth device, a computing device (e.g., a desktop computer, etc.), or any other device configured to transmit and/or receive signals.

Sensor values measured by the mobile device may be properties of signals emitted from the signal sources. In some instances, the sensor values may be values corresponding to signal strengths of measured signals (e.g., RSSI values) or any other suitable signal property that changes with respect to distance from a signal's point of origin. In other instances, the signal values may be a signal indicative of a distance between the mobile device and the signal's point of origin (e.g., time-of-flight (TOF) measurement values). Exemplary TOF measurements include round trip time (RTT) and one-way ranging measurements. One-way ranging measurements may be performed by synchronizing a clock of the mobile device with a clock of a signal source using IEEE 1588 or its equivalent and then using one-way ranging (e.g., via radio waves such as Wi-Fi, ultrawideband, or radar, or sound waves) to compute a TOF measurement value. In some examples, synchronization may use GPS receivers in each device that are synchronized to GPS time. In other examples, the synchronization may be performed using Wi-Fi waveforms that are not designed for ranging, with Wi-Fi waveforms that are in a different frequency band, with ultra-wide-band (UWB) signals, using atomic clocks that are high quality. In some instances, the synchronization may be at 10 nanoseconds or better.

Although FIG. 6A illustrates floor plan 600 as having only three signal sources 601, 603, and 605, any number of signals sources (e.g., more or less) may exist and/or be used according to aspects of the present invention. Further, signal sources may be positioned in the same room as the mobile device, in a different room from the mobile device, or may be external to the structure). As an example, one or more signal sources may be located in a neighbor's home or office outside of floor plan 600 or in the floor above (or below) floor plan 600. It should be appreciated that signal sources may be located in any position from which wireless signals emitted may be measured by a mobile device according to aspects of the present disclosure.

A. Measurement of Sensor Position

Within floor plan 600, a plurality of sensor positions may be measured by the same mobile device. For instance, as shown in FIG. 6A, sensor values may be measured at a physical position 602 by the mobile device at time $T_0$, while other sensor values may be measured at a physical position 604 by the mobile device at time $T_1$, where $T_0$ does not equal $T_1$. For example, the mobile device may located at physical position 602 in the afternoon when the mobile device is determining its sensor position upon detecting a first triggering event, and the mobile device may be located at physical position 604 in the evening when the mobile device is determining its sensor position upon detecting a second triggering event.

Physical position 602 may be defined by a sensor position containing sensor values measured from signals emitted from signal sources 601, 603, and 605. The sensor values may represent one or more signal properties of the signals emitted from signal sources 601, 603, and 605. As shown in FIG. 6A, physical position 602 may be defined by the properties of signals 606, 608, and 610 measured from signal sources 601, 603, and 605, respectively. Similarly, physical position 604 may be defined by the properties of signals 612, 614, and 616 measured from signal sources 601, 603, and 605, respectively. For example, the sensor values may be an RSSI and/or a TOF (e.g., RTT) of signals emitted from signal sources 601, 603, and 605.

In addition to the sensor values, the mobile device may also receive and record an identification of the signal source. The signal source identification may be any suitable form of identification for the signal source, such as a media access control (MAC) address, internet protocol (IP) address, or the like. The identification of the signal source may be appended to a respective sensor value, such that the mobile device may identify which signal source emitted the measured signal. Other information may also be appended to the measured sensor value. For example, information representing a time interval across which the sensor value was measured, signal payload (e.g., packets), etc. may also be appended to the measured sensor value.

The sensor values may be measured by one or more sensors of the mobile device. Once the signals are measured, the one or more sensors may send the measurements to a sensor position module to generate a sensor position corresponding to physical position 602. The sensor position may be a multi-dimensional data point, which may be represented as a feature vector $x_k$ containing measured signal properties.

For example, a feature vector $x_k$ may be defined as:

$$x_k = \begin{bmatrix} RSSI_k^1 \\ RSSI_k^1 \\ \vdots \\ RSSI_k^M \\ RTT_k^1 \\ RTT_k^2 \\ \vdots \\ RTT_k^N \end{bmatrix}$$

for M number of RSSI values and N number of RTT values, where each integer of M and N corresponds with an identifier of a source signal (e.g., media access control (MAC) address, universally unique identifier (UUID), truncated UUID, Bluetooth device address, or an IP address of an access point) for the associated sensor value, and where k represents a time interval across which the signal value was measured. It should be appreciated that one or more RSSI and RTT values may be measured from the same signal source and thus have the same identifier. Although feature vector $x_k$ includes RSSI and RTT sensor values, a feature vector $x_k$ can include other types of sensor values (in addition to or in place of RSSI and RTT sensor values) for determining a sensor position B. Creating a Multi-Dimensional Data Point Sensor values may be measured and stored in a database, such as a sensor position database for use in generating a multi-dimensional data point. In some instances, a filtering step may be performed to avoid storing sensor value measurements that may be distorted or unreliable.

1. Data Measuring

Figure 6B:
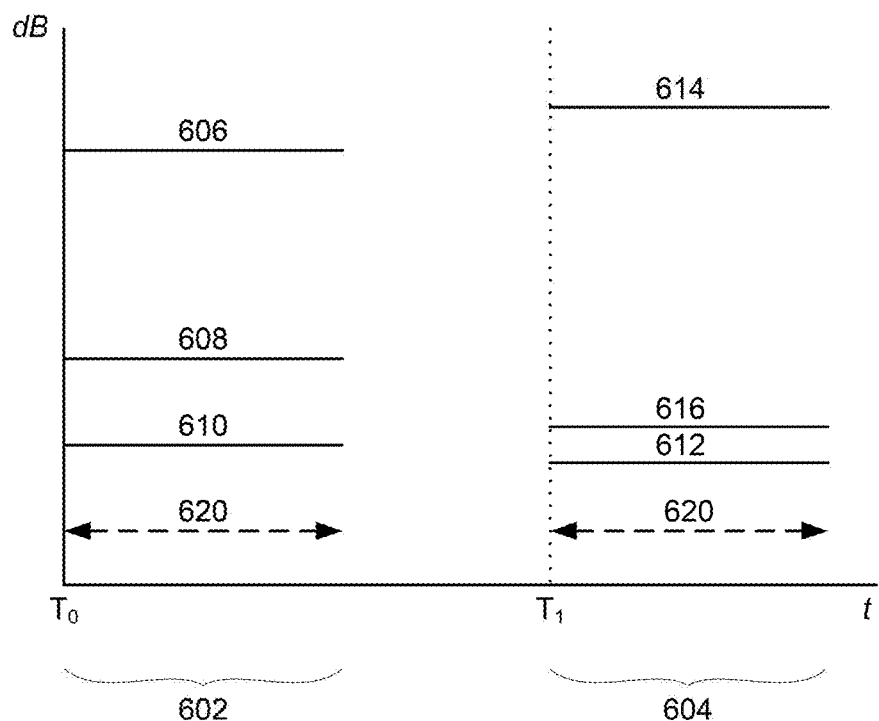
FIG. 6B is a chart representing sensor measurements for determining a sensor position according to aspects of the present disclosure.

Multiple sensor values may be measured across a predetermined time interval to create a multi-dimensional data point. FIG. 6B is a chart illustrating an exemplary measurement of sensor values (e.g., RSSI signal values) at physical positions 602 and 604 at time $T_0$ and $T_1$, respectively, across a time interval 620. The vertical axis may represent signal strength in decibels (dB) and the horizontal axis may represent time (t).

$T_0$ may be an instance in time in which a triggering event is detected that causes the mobile device to measure a current sensor position. At time $T_0$, sensor values may be measured for signals 606, 608, and 610 at physical position 602. The sensor values may be measured for a duration of time (e.g., interval 620). In some embodiments, multiple measurements of signals 606, 608, and 610 may be made across time interval 620. Time interval 620 may be an amount of time that is long enough for the mobile device to accurately measure a sensor value. In some instances, the length of time interval 620 may be based on two factors: measurement accuracy and power consumption (e.g., time interval 620 may be limited to reduce the power drawn from a power source, such as a battery). In some instances, a time interval 620 may be less than one second.

After $T_0$ and after the mobile device has moved to physical position 604, the mobile device may detect another triggering event and begin to measure its sensor position again at time $T_1$. At $T_1$, the mobile device may measure sensor values of signals 612, 614, and 616 from signal sources 601, 603, and 605, respectively, across time interval 620.

As shown in FIG. 6B, some sensor values may have higher dB levels than other signals at each sensor position. This may be because signal strength is inversely proportional to the distance of separation between a sensor and a signal's point of origin (e.g., signal source), meaning shorter distances of separation may result in higher signal strengths. Each sensor position may have its own distinctive arrangement of signal strengths. Furthermore, depending on the location of the mobile device when sensor values are measured, the mobile device may not detect some signals emitted from certain signal sources. Accordingly, each sensor position may include sensor values from a unique set of signal sources. As a result, some sensor positions may have different sensor values, and other sensor positions may have similar sensor values. The similarities and differences in signal strengths and arrangements of signals sources may be analyzed to define clusters of sensor positions that include similar properties.

Measuring sensor values across a predetermined time interval may create a trend of sensor values. For example, each sensor value measured at physical position 602 and physical position 604 may have a substantially horizontal trend of sensor values. A horizontal trend indicates that the mobile device was not substantially moving while measuring sensor values. Horizontal trends may indicate accurate sensor value measurements. A trend of sensor values that are not substantially horizontal may indicate that the mobile device has substantially moved during measurement of the sensor values and that the measurements may be inaccurate. Inaccurate measurements may be filtered out. Filtering may occur for other signal properties than the signal strength shown in FIG. 6B, such as TOF measurements.

Figure 7:
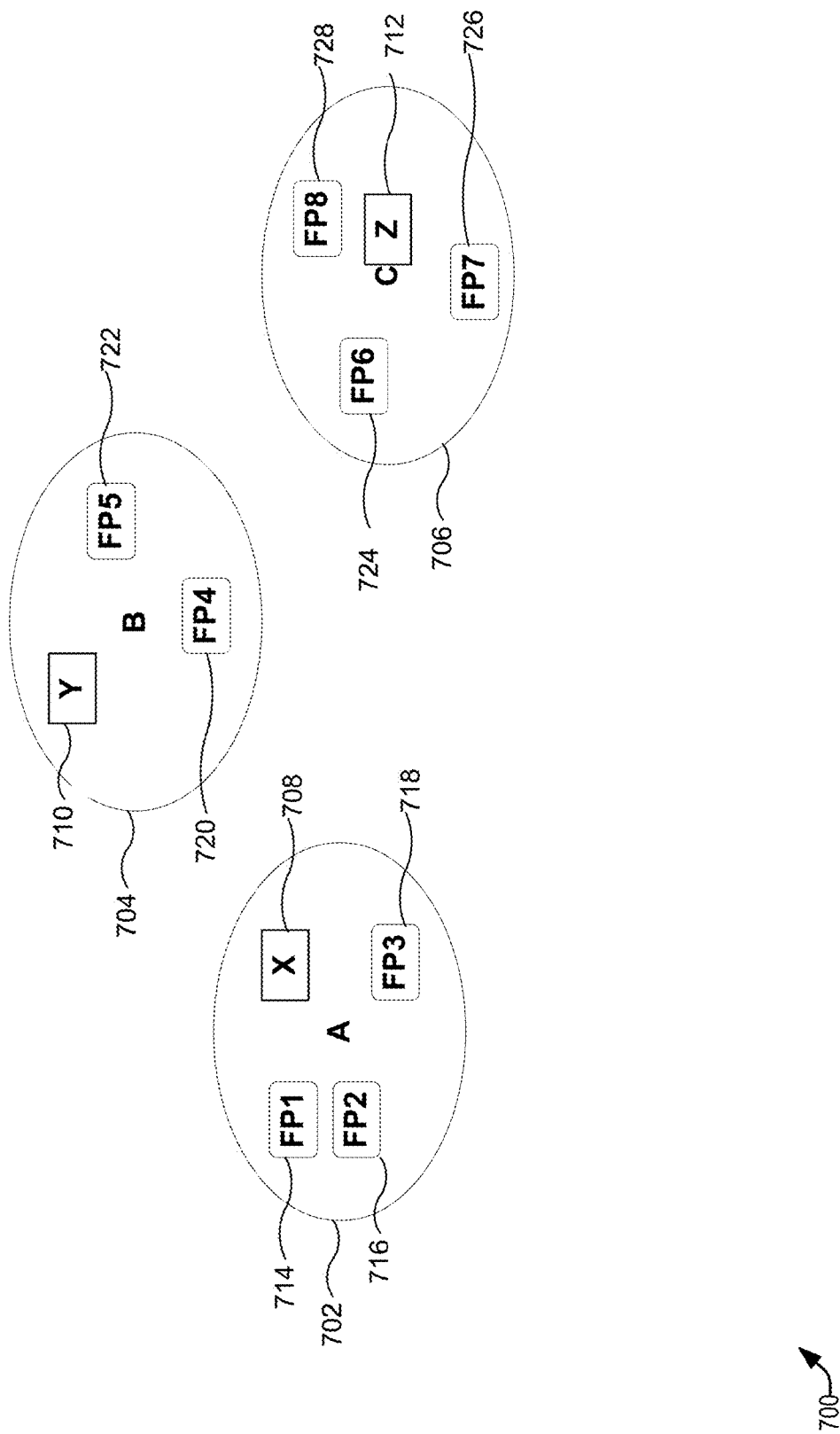
FIG. 7 illustrates an exemplary cluster map.

FIG. 7 illustrates an exemplary cluster map 700. FIG. 7 illustrates three clusters (e.g., cluster-A 702, cluster-B 704, and cluster-C 706). A cluster can present a probable location of a mobile device. FIG. 7 illustrates various targets (e.g., Target-X 708, Target-Y 710, and Target-Z 712). Each of the targets can indicate a location of different mobile device. FIG. 7 also illustrates various fingerprint signatures (e.g., fingerprint-1 (FP1) 714, fingerprint-2 (FP2) 716, fingerprint-3 (FP3) 718, fingerprint-4 (FP4) 720, fingerprint-5 (FP5) 722, fingerprint-6 (FP6) 724, fingerprint-7 (FP7) 726, fingerprint-8 (FP8) 728). A fingerprint signature can be a location based on part on a received signal strength of a received wireless signal. Each fingerprint can include the measurements from all the surrounding routers, Bluetooth sources, and also UWB sources. These fingerprint values can form a high dimensional vector with some values being Wi-Fi RSSI, some values being Bluetooth RSSI, and some values being UWB ranges.

For example, a device can be represented by Target-Z 712 in cluster C. Not only can the system predict that a device is in a particular cluster, but the mobile device can also predict what other devices are also in the same cluster without receiving and measuring information from the other device. If orientation of data of the mobile device is available, the mobile device can point to one or more playback devices to resolve the ambiguity.

If orientation information is available, then there is no ambiguity. But if pointing is not available, then the mobile device may use distances (e.g., UWB ranging) to generate the list. But if pointing and ranging is unavailable, microlocations can be used to generate the heat map to predict which cluster the mobile device is in with respect to various playback devices.

In various embodiments, hybrid clusters can exist with devices that have ranging capabilities and devices that do not have ranging capabilities. For example, if Target-Z 712 does not have UWB capabilities, it can use Bluetooth signal for range estimates, or it can use microlocation information to determine if Target-Z 712 is in Cluster-C 706. Instantaneous measurements of wireless signals (e.g., Bluetooth) may be used but they may not be as stable for precise measurements as microlocations.

In various embodiments, the one or more signals can be transmitted from a router or entry point in a room. Therefore, the one or more signals may be stable. In various embodiments, the mobile device can average the received signal strength indication from either the router, the entry point, other mobile devices, or one or more playback devices. In various embodiments, the mere reception or appearance of the signal can be used to determine the cluster.

A given measurement of one or more wireless signals obtained at a physical position may be made one or more times over a time interval to obtain a set of sensor value(s). Two measurements at two different times can correspond to a same microlocation (e.g., when the two measurements are made at a same physical position at the two different times). A microlocation can have a value of zero for a given dimension. For instance, a microlocation may have a value of zero for a given dimension when a microlocation of a particular wireless signal is not measured or has a nominal value such as low signal power (−100 dB Received Signals Strength Indication (RSSI)), a large distance between the mobile device and signal source, or uncertainty is too high.

The microlocation or the proximity of a microlocation to a cluster (e.g., cluster location) may be used to form a prediction that that playback of selected media should occur locally (e.g., on the mobile device) or on one or more remote devices. For instance, if playback of selected media occurs in a microlocation that is too far away from a remote device, playback may occur locally. If the microlocation is near only one remote device, then the probability that the user may intend to stream the media to the remote device may be high and the media stream may be automatically initiated. If there are more than one remote devices near the microlocation, then the probably that any one of the remote devices would be the intended destination of the media stream may not be high enough to automatically route the media stream. In that situation, the user may be prompted to select from among the likely remote devices.

In various embodiments, each of the playback devices can have a signature emissions fingerprint. For example, a media device (e.g., an AppleTV) may have a very short UWB range and a very strong UWB signal strength. This type of signal characteristic can be used to identify the playback device and ultimately which one of multiple clusters that the playback device is in.

In various embodiments, the location determined via UWB ranging, Bluetooth instantaneous measurements, and RSSI from one or more wireless signals can be combined using various weights.

In various embodiments, the mobile device can calculate the anchor device's proximity ranks based on Fingerprints (FPs) information from a model. For this calculation, an assumption is that all anchor devices are BLE emitters and a subset of anchor devices are both BLE and UWB emitters. The mobile device can calculate a probability score for each of the microcluster locations. The probability scores can be used to rank the playback devices based on a location for of the mobile device. For a proximity score algorithm:

R is a set of radio frequency fingerprints.
M is a set of microlocations (cluster IDs), each M is a subset of R, such that M is a partition of R.
A is a set of anchors, each anchor in A can appear in multiple fingerprints The process can include calculating an aggregated measurement value of each anchor device in each cluster during model learning (prior to selection representative FPs for m:M, for r:R, for a:r).

SumofPerAnchorPerClusterMeasValue+=a·measValue anchorMeasValue2dMap[m][a]=sumofPerClusterMeasValue/count;

This map can be saved to a memory. The mobile device can return this aggregated per cluster measurement value to NI upon SPI request. NI can trigger a localization scan or leeches localization results and can calculate a proximity score of each anchor based on this 2D map.

The 2D map can be updated periodically (e.g., daily) and the localization probability vector can be calculated using the following equations:

totalScore[a]=instantaneousTestFPScore+locationRelevanceScore wherein the instaneousTestFPScore is the instantaneous Bluetooth measurement score from a user mobile device to a target device and the locationRelevanceScore is based on microlocation calculations which is a probability of how likely the user mobile device and the playback device are in the same cluster.

instantaneousTestFPScore[a]=testFPWeight*(testFPAnchorMeasValue−weightBaseLineValue) wherein testFPWeight is a weighting value that can be adjusted based on trust of the microlocation determination based on microlocation probability vector characteristics. For example, there may be a very dominant cluster prediction that the mobile device may calculate a high confidence level that may be trusted more as compared with instantaneous Bluetooth measurement scores. The testFPAnchorMeasValue can be optimized using machine learning. For example, testFPAnchorMeasValue can depend on what the RSSI is and a table using different weights can depend on what the RSSI value is or it can also depend on the locationRelevanceScore[a]. The testFPAnchorMeasValue may depend on the confidence of micro location at that time. If microlocation confidence is low such as if the technique predicts two clusters, e.g., one cluster is predicted at 51% probability and the other cluster one is at 49% probability, then that means microlocation is not certain which cluster the mobile device is in and probably the technique should trust the instantaneous score more. If microlocation predicts like a 90% in one cluster and 10% in the other that means microlocation is very confident that the mobile device is in just one of the clusters and the technique can put more weight on microlocation information.

locationRelevanceScore[a]=ΣprobabilityVector[m]*
(anchorMeasValue2Dmap[m][a]−weightBaseLineValue)

Wherein the locationRelevanceScore[a] is based on a RSSI difference of a probability vector of M clusters that can be learned by the one or more wireless signals from routers, Bluetooth static sources, and UWB static sources. When microlocations are used along with a probability vector and this map, the mobile device can use the information from other routers and UWB sources. The weightBaseLineValue can be the background for the signal. The anchorMeasValue2Dmap[m][a] can be a typical measure of the value of a particular device in a cluster with m being the cluster identification and a being the source identifier for each potential playback device. In other words, anchorMeasValue2Dmap[m][a] can be the actual RSSI measurement. The difference term of (anchorMeasValue2Dmap[m][a]−weightBaseLineValue) can be an average signal value for the cluster or the typical strength for that particular target. As multiple targets can be in the cluster, locationRelevanceScore[a] can be a score for a specific target in the cluster. The locationRelevanceScore[a] can be using in combination with UWB to rank the relevance of specific playback devices. The term probabilityVector[m] can be a formula that calculates based on the learned clusters the probability of being in a particular cluster.

In various embodiments, targets in the same cluster can be ranked together. For example, if a first device in a particular cluster has UWB ranging capabilities, that information can be used for ranking a second device without UWB ranging capabilities if it is determined that the first device and the second device are in the same cluster.

In the example illustrated in FIG. 7, the three cluster locations (e.g., cluster-A 702, cluster-B 704, and cluster-C 706) have already been learned. Therefore, the microlocation calculation will determine a probability of being in each cluster (e.g., cluster-A 702, cluster-B 704, and cluster-C 706).

In various embodiments, if the location relevance score is low enough for a particular playback device, the playback device will not be included on the list of playback devices.

V. Exemplary Home Environment with Playback Devices

Increasingly electronic devices can include the capability to receive streaming media content. A user may be watching a video on a smartphone but may desire to watch the content on a larger device (e.g., a smartTV). The home environment may have numerous devices capable of receiving the media content. For example, the home may include a smartTV in a living room and one in a bedroom. By determining relevant media devices for streaming content, a user can easily select from devices relevant to the present location instead of perhaps a long list of devices for a residence or a business.

A. Device Layout

Figure 8:
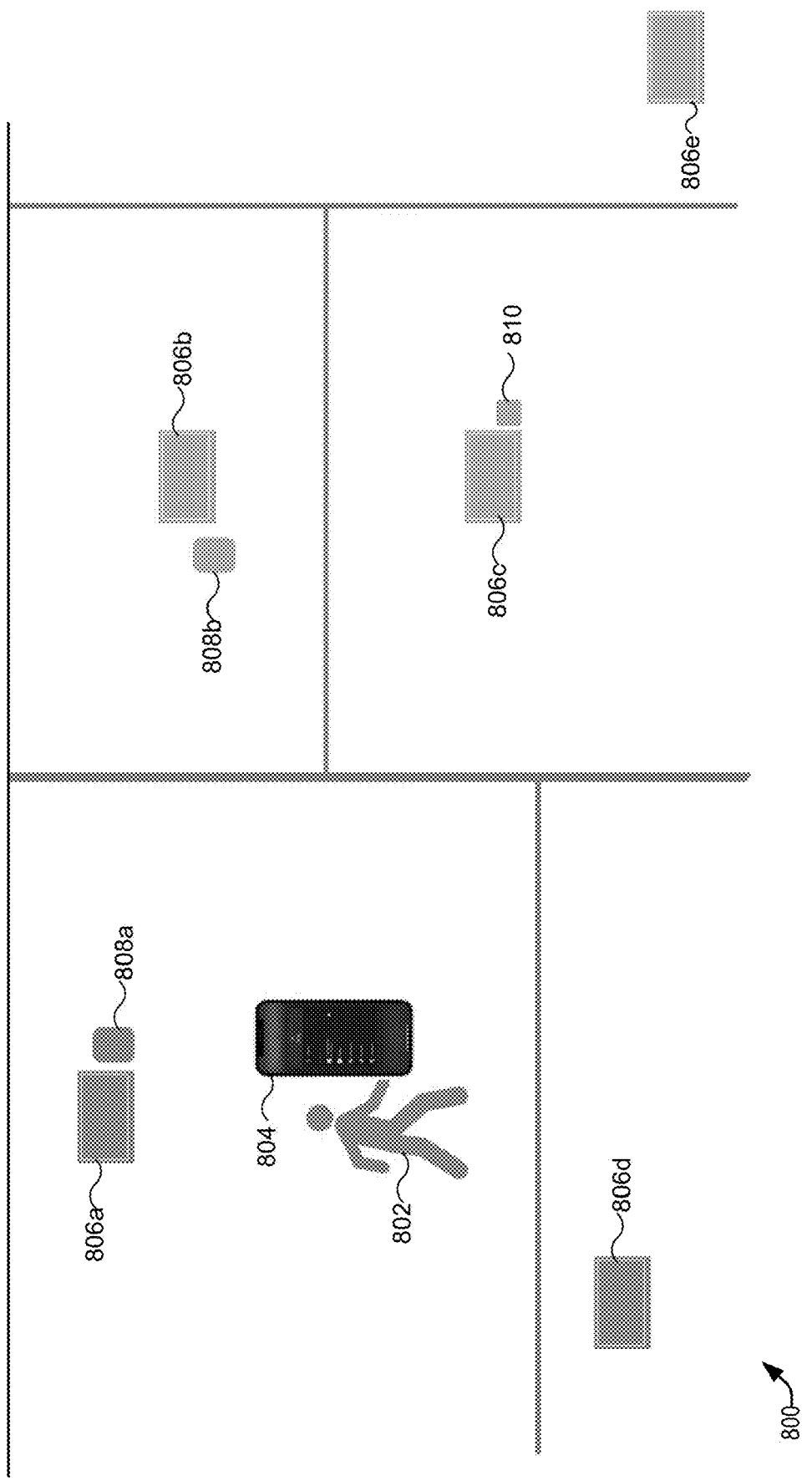
FIG. 8 illustrates an exemplary schematic of a device distribution.

FIG. 8 illustrates an exemplary environment 800 (e.g., a home) in which multiple playback devices are distributed. A user 802 can operate a mobile device 804 to play media content (e.g., video content, audio content, or screen data). For example, the playback devices can include a television 806 (e.g., a smartTV), a smartspeaker 808, and media player 810. A first television 806a and a first smartspeaker 808a can be in the same room as the user 802. A second television 806b and a second smartspeaker 808b can exist in a second room. A third television 806c and a media player 810 can be in a third room. A fourth television 806d can exist in a fourth room. A fifth television 806e can exist outside a location. The number and types of devices as shown in FIG. 8 are exemplary and not one of limitation.

A user 802 may desire to play media content from a mobile device 804 on a playback device. In various embodiments, the software of the mobile device 804 would automatically suggest a wireless streaming route based on a combination of usage history, App usage, and microlocations. For example, the mobile device 804 would record a history of interactions with an App and location of the mobile device 804 using microlocations to establish a pattern over time. Specifically, if a particular user always streamed media content to the smartTV in a bedroom from the media streaming App (e.g., YouTube) the mobile device would suggest the bedroom smartTV when promoted for selecting a playback device to stream the media content.

Modern environments can consist of many different playback devices in the home or workplace. In addition, many playback devices can include ranging capabilities (e.g., UWB ranging) that allow the mobile device 804 to quickly and accurately determine a location and/or an orientation of the mobile device with respect to the various playback devices. Therefore, the ranging capabilities can be used by the software of the mobile device 804 to determine which playback devices are most relevant to the user 802 at a time that streaming is desired. In various techniques, a list of playback devices can be presented on a user interface of the mobile device 804 for the user 802 to select. The list can be an alphabetical list of devices. As the number of Smart devices continues to grow, the list can include dozens of playback devices.

While microlocation information can be used, the data for microlocation determination can take time to build. Microlocations are not actual locations but similar to electromagnetic fingerprints that need to be correlated with something in order to provide useful information. In addition, microlocations require learning and may only be enabled at home location. Ranging techniques may provide additional capabilities to help a user determine relevant playback devices.

A composite approach, incorporating one or more of three different techniques, can be used to put the most relevant playback devices at the top of the list. The mobile device 804 can use UWB ranging, RSSI determination, and orientation of the mobile device 804 to determine a priority on a list and whether or not the playback device should even be included in the list of relevant playback devices.

B. Determining Capabilities of Devices

Figure 9:
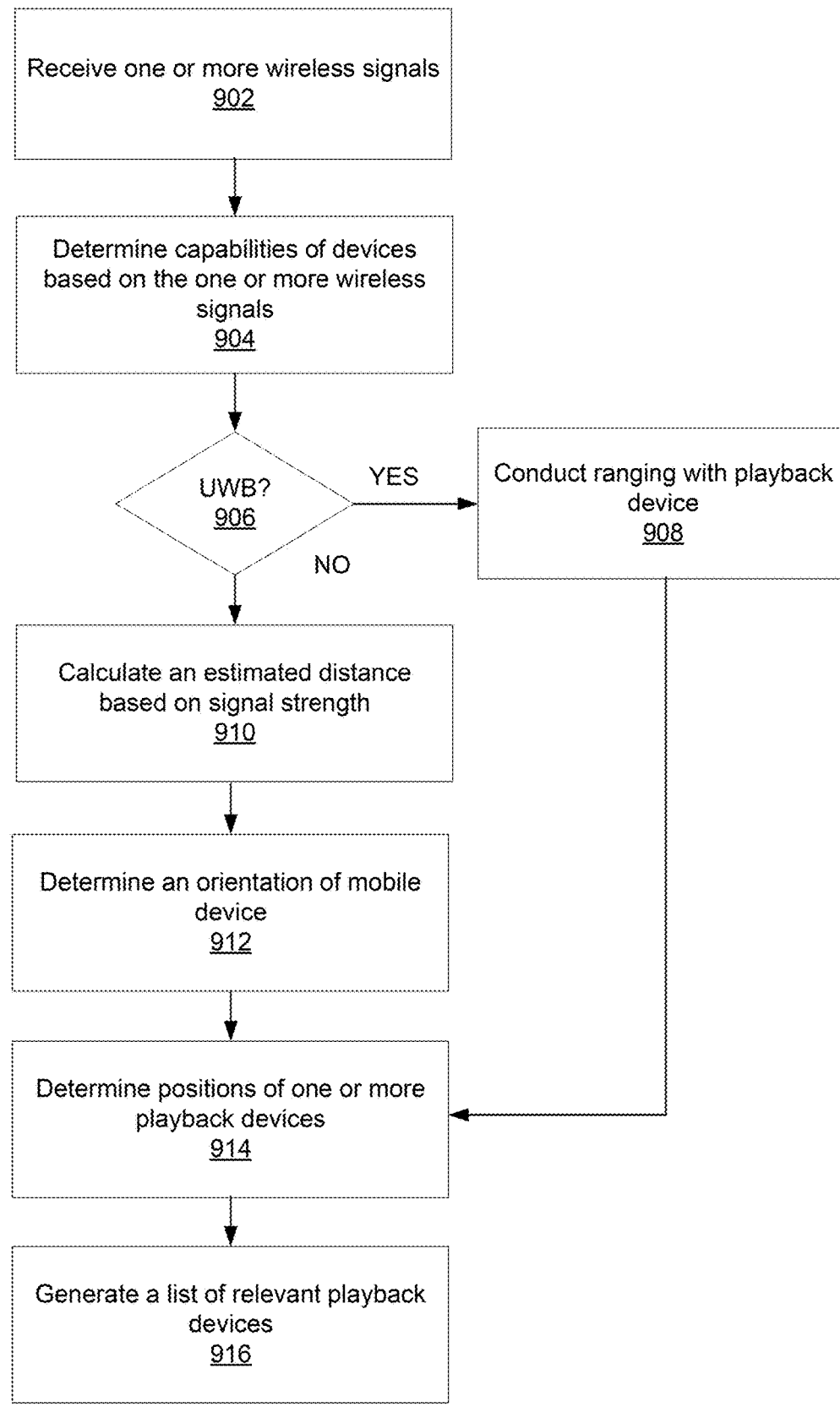
FIG. 9 is a flowchart illustrating a method for performing secure ranging with a mobile device.

FIG. 9 is an exemplary flow chart of a process 900, according to an example of the present disclosure. According to an example, one or more process blocks of FIG. 9 may be performed by mobile device 1300.

At block 902, process 900 may include receiving one or more wireless signals. The wireless signals can be an advertising signal. The wireless signal can be Bluetooth, Bluetooth Low Energy, Wi-Fi, UWB, or one or more various wireless signal protocols.

At block 904, process 900 may include determining capabilities of devices based on the one or more wireless signals. In various embodiments, the playback devices can include a ranging capability (e.g., UWB ranging). The determining capabilities of devices can be done be analyzing the received one or more signals. In various embodiments, the received signal can include an identifier for the playback device. In various embodiments, the received signal can include an information packet that indicates capabilities of the playback device.

In various embodiments, the capability information can be received from the playback device itself via different technology. For example, if the mobile device detects a UWB signal, a BLE signal, and a Wi-Fi signal at the same location, the mobile device can correlate those signals by means of an identifier for the various signals. The mobile device can determine that all three signals may be originating from the same device. Another way to correlate the signals is determining how the signals interfere with one another.

In various embodiments, the determined the capabilities of the playback devices can be done through other protocols (e.g., Bonjour or many other different discovery-type challenges). The techniques may be able to detect a type of device (and hence determine its capabilities) based on the number and/or type of wireless signals being emitted from the device.

At block 906, process 900 may include determining if a particular playback device associated with the one or more wireless signal is capable of TOF calculation (e.g., UWB ranging).

At block 908, process 900 may include conducting ranging with one or more playback devices. The ranging can include transmitting and receiving one or more wireless signals as described above. The ranging process can determine a distance between the mobile device 804 and one or more playback devices. The distance between the mobile device 804 and one or more playback devices can be stored in a memory of the mobile device 804.

At block 910, process 900 may include calculating an estimated position based on signal strengths of the one or more signals. While ranging can provide very accurate measurements, not all playback devices have ranging capabilities. Determining position using RSSI is not as accurate as UWB ranging, but it is still a header wise communication technique. The mobile device 804 can determine a received signal strength indication of the one or more wireless signals. The received signal strength indication can be used to determine a location of the mobile device by generating a heat map a space (e.g., a room, an office, an area). The location of various playback devices in the heat map can be known by the mobile device. Therefore, when the location of the mobile device within the heat map is determined, the mobile device can determine relevant playback devices based on location of the mobile device with respect to one or more playback devices.

In various embodiments, the techniques may not strictly rank all of the playback devices (e.g., in order 1 to 10) but to determine which devices should be listed as part of a relevant set of devices. It may not be important for the techniques to allow the mobile device to determine a numerical ranking, but the techniques should allow the mobile device to distinguish essentially binary classification of ones that are worthwhile to display and ones that are not when you're in an instance where there is some ambiguity, you know, there is not a very clear pointing.

In various embodiments, one or more routers or access points can generate the one or more wireless signals used to generate the heat map. The heat map can be used to determine one or more microlocations. The micro location can provide both where the mobile device is mapped at one location. The user can be located at the mobile device at a moment in time in the heat map but also where are the other Bluetooth anchors and the UWB anchors are in that heat map at that moment in time.

At block 912, process 900 may include determining an orientation of the mobile device based on the one or more wireless signals. In various embodiments, the one or more wireless signals can be Bluetooth, Bluetooth Low Energy, Wi-Fi, or UWB protocol.

The received signal strength information can be used to generate a heat map to determine the location of the mobile device 804 on the heat map.

At block 914, process 900 may include determining positions of one or more playback devices. If ranging (e.g., UWB ranging) is available, the ranging can be used to determine the position of the one or more playback devices relative to the mobile device. If ranging is not available, the mobile device can determine the position of one or more playback devices by measuring received signal strength indication (RSSI) and generating a heat map. The heat map can indicate the location of the mobile device relative to one or more playback devices. In various embodiments, the orientation of the mobile device can be determined based on the time of receiving the one or more wireless signals at the various antennas on the mobile device. The orientation of the mobile device can be used alone or in combination with the position of the mobile device to determine if a user is pointing the mobile device at a particular playback device.

At block 916, process 900 may include generating a list of relevant playback devices. The mobile device can use the location information to determine relevant playback devices. A relevant device can be a closest device to the mobile device, a playback device within a threshold distance from the mobile device, or a playback device within a same room as the mobile device. Additionally or alternatively, a relevant device can be a playback device that the mobile device is pointing at or a playback device that is in front of a user with the mobile device.

It should be noted that while FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

C. Exemplary Device List

After performance of one of the techniques for determining a location of the one or more playback devices, the mobile device can generate a list to allow a user to select a playback device for streaming the media content. The list can be presented on a display of the mobile device. The list can be a graphical user interface that can allow a user to select the desired device for playback of the media content. Various playback devices may be detected by the mobile device but may be excluded from the list if various conditions exist (e.g., the playback device is on another floor (e.g., in an upstairs apartment).

Figure 10:
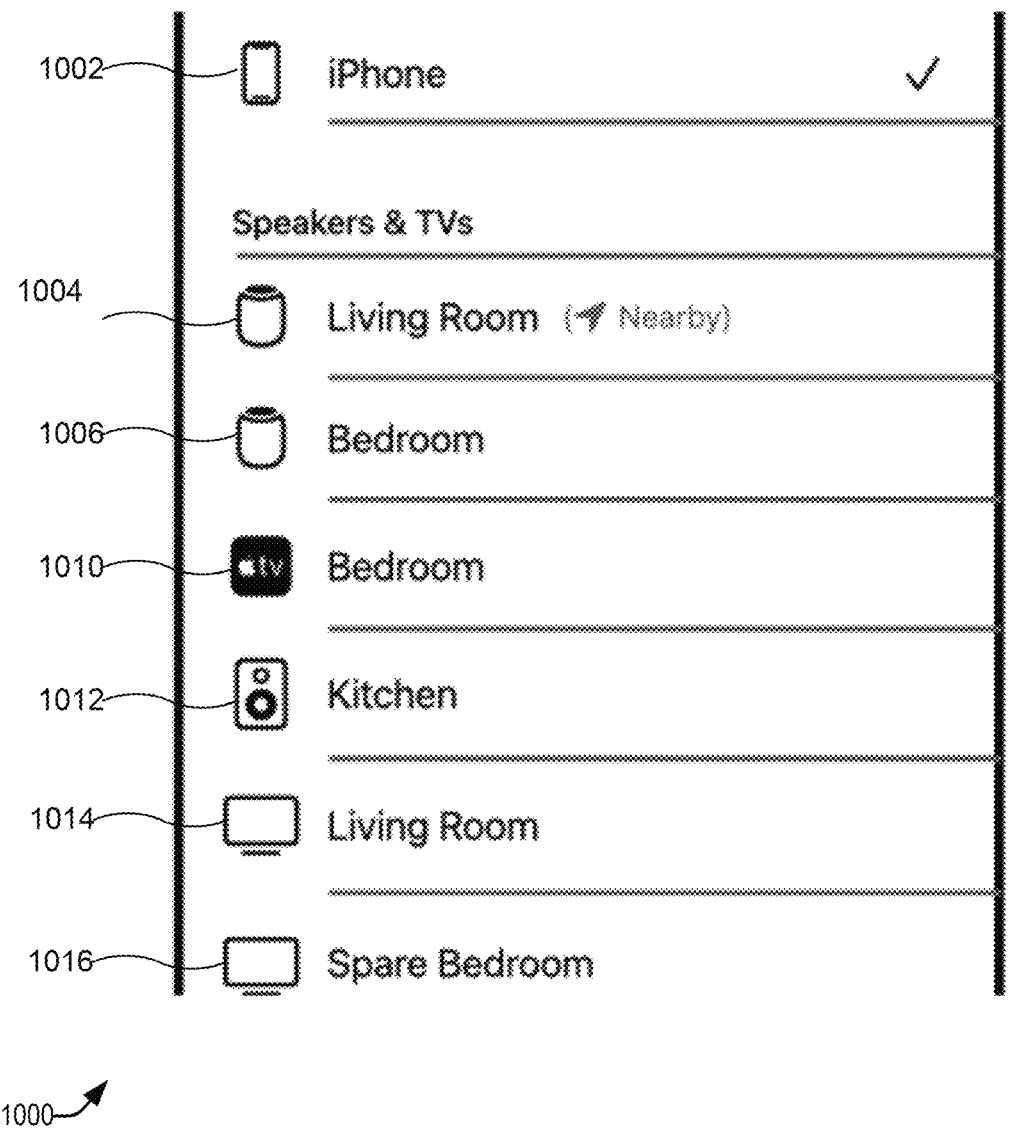
FIG. 10 illustrates an exemplary list of potential devices.

FIG. 10 illustrates an exemplary list 1000 of potential playback devices. In various embodiments, the list 1000 can include an icon indicating a type of media device and a location of the media device. For example, a living room device 1004 can include an icon for a smartspeaker (e.g., a HomePod) and the location (e.g., a living room). In various embodiments, the list 1000 of playback device can be a graphical user interface that allows a user to select the playback device of the listed playback device to direct a media stream. In various embodiments, the list 1000 can list the device 1002 (e.g., an iPhone) that a user is attempting to stream from. In various embodiments, the user can also stream from a laptop computer, a tablet computer, or a wearable device.

FIG. 10 illustrates list 1000 that includes a living room device 1004 (e.g., a smartspeaker), a bedroom device 1006 (e.g., a smartspeaker), a first bedroom device 1008 (e.g., a smartspeaker), a second bedroom device 1010 (e.g., a media player). A kitchen device 1012 (e.g., a smartspeaker), a living room device 1014 (e.g., a smartTV), and a spare bedroom device 1016 (e.g., a smartTV).

VI. Exemplary Flow

Figure 11:
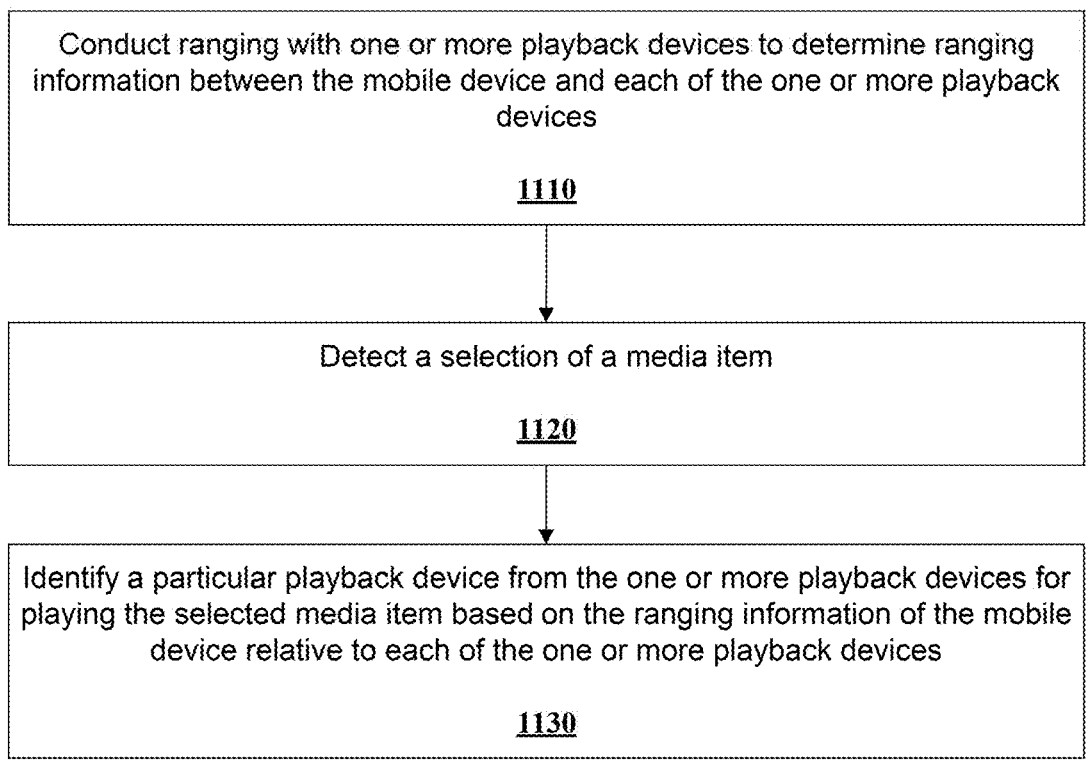
FIG. 11 is a flowchart illustrating a method for performing secure ranging with a mobile device.

FIG. 11 is a flow chart of a process 1100, according to an example of the present disclosure. According to an example, one or more process blocks of FIG. 11 may be performed by mobile device 1300.

At block 1110, process 1100 may include conducting ranging with one or more playback devices to determine ranging information between the mobile device and each of the one or more playback devices, where the one or more playback devices are configured to play the streaming data when received from the mobile device, and where the ranging information provides at least one of a distance and an orientation between the mobile device and each of the one or more playback devices. For example, mobile device 1300 may conduct ranging with one or more playback devices to determine ranging information between the mobile device and each of the one or more playback devices, where the one or more playback devices are configured to play the streaming data when received from the mobile device, and where the ranging information provides at least one of a distance and an orientation between the mobile device and each of the one or more playback devices, as described above.

At block 1120, process 1100 may include detecting a selection of a media item. For example, mobile device 1300 may detect a selection of a media item, as described above. For example, an application may present a graphical user interface for selecting a streaming option. In various embodiments, a media application may display an icon that indicates a desire to stream the media item to one or more playback devices.

At block 1130, process 1100 may include identifying a particular playback device from the one or more playback devices for playing the selected media item based on the ranging information of the mobile device relative to each of the one or more playback devices. For example, mobile device 1300 may identify a particular playback device from the one or more playback devices for playing the selected media item based on the ranging information of the mobile device relative to each of the one or more playback devices, as described above. In various embodiments, the playback devices can be indicated on a list. The identifying can be done using any one or combination of the techniques described above (e.g., UWB ranging, instantaneous Bluetooth, wireless RSSI, or orientation of the mobile device.)

Process 1100 may include additional implementations, such as any single implementation or any combination of implementations described below and/or in connection with one or more other processes described elsewhere herein. A first implementation, process 1100 further includes measuring one or more sensor values at one or more times, the one or more sensor values measured using one or more sensors of the mobile device, where the one or more sensor values are determined from one or more signals emitted by a corresponding one or more signal sources; determined a relative position of the mobile device with respect to the one or more playback devices based on the one or more sensor values; and identifying a particular playback device from the one or more playback devices in a list for playing the selected media item based on the relative position of the mobile device relative to the one or more playback devices.

In a second implementation, alone or in combination with the first implementation, the one or more signal sources may include the one or more playback devices. The one or more playback devices can be a smartTV, a media device (e.g., an AppleTV), a smart speaker (e.g., a HomePod), etc.

In various aspects, a mobile device can include one or more memories; and one or more processors in communication with the one or more memories and configured to execute instructions stored in the one or more memories to perform any one or combination of the operations described above.

In various embodiments, a non-transitory computer readable medium can store instructions when executed by one or more processors of a computing device to cause the one or more processors to perform operations of a method of any one or combination of the operations described above.

In various embodiments, the determining the relative position of the mobile device with respect to the one or more playback devices may include generating a heat map of the one or more signals at a location. The heat map can identify positions of the one or more playback devices at the location. The process can include determining a plurality of clusters at the location based on the heat map. Each cluster can be physically apart at the location. The process can include determining a probability of the mobile device being within one of the plurality of clusters based on a received strength of the one or more signals and the heat map.

In various embodiments, process 1100 further includes determining a probability of detecting a particular signal of the one or more signals over a time period; and determining if the mobile device is within a particular cluster based in part on the probability.

In various embodiments, process 1100 further includes determining an orientation of the mobile device relative to the one or more playback devices. The process can include identifying the particular playback device from the one or more playback devices in a list of the one or more playback devices for playing the selected media item based on the orientation of the mobile device relative to the one or more playback devices.

In various embodiments, process 1100 further includes receiving advertising signals from the one or more playback devices. The advertising signals can provide information regarding communication capabilities of each of the one or more playback devices. The advertising signal can include an authentication tag of a particular playback device of the one or more playback devices. The method can further include authenticating the particular playback device based at least in part on the authentication tag.

In various embodiments, process 1100 may include displaying, on a screen of the mobile device, an icon corresponding to the particular device, where the icon is displayed at a location on the screen based on the one or more ranges or the relative position of the mobile device.

In various embodiments, process 1100 further includes receiving a gesture on a display of the mobile device; and identifying a particular playback device from the one or more playback devices in a list of the one or more playback devices for playing the selected media item based on the received gesture.

In various embodiments, process 1100 further includes routing information to the particular playback device for playing the media item.

It should be noted that while FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

VII. Mobile Device for Performing Ranging

Figure 12:
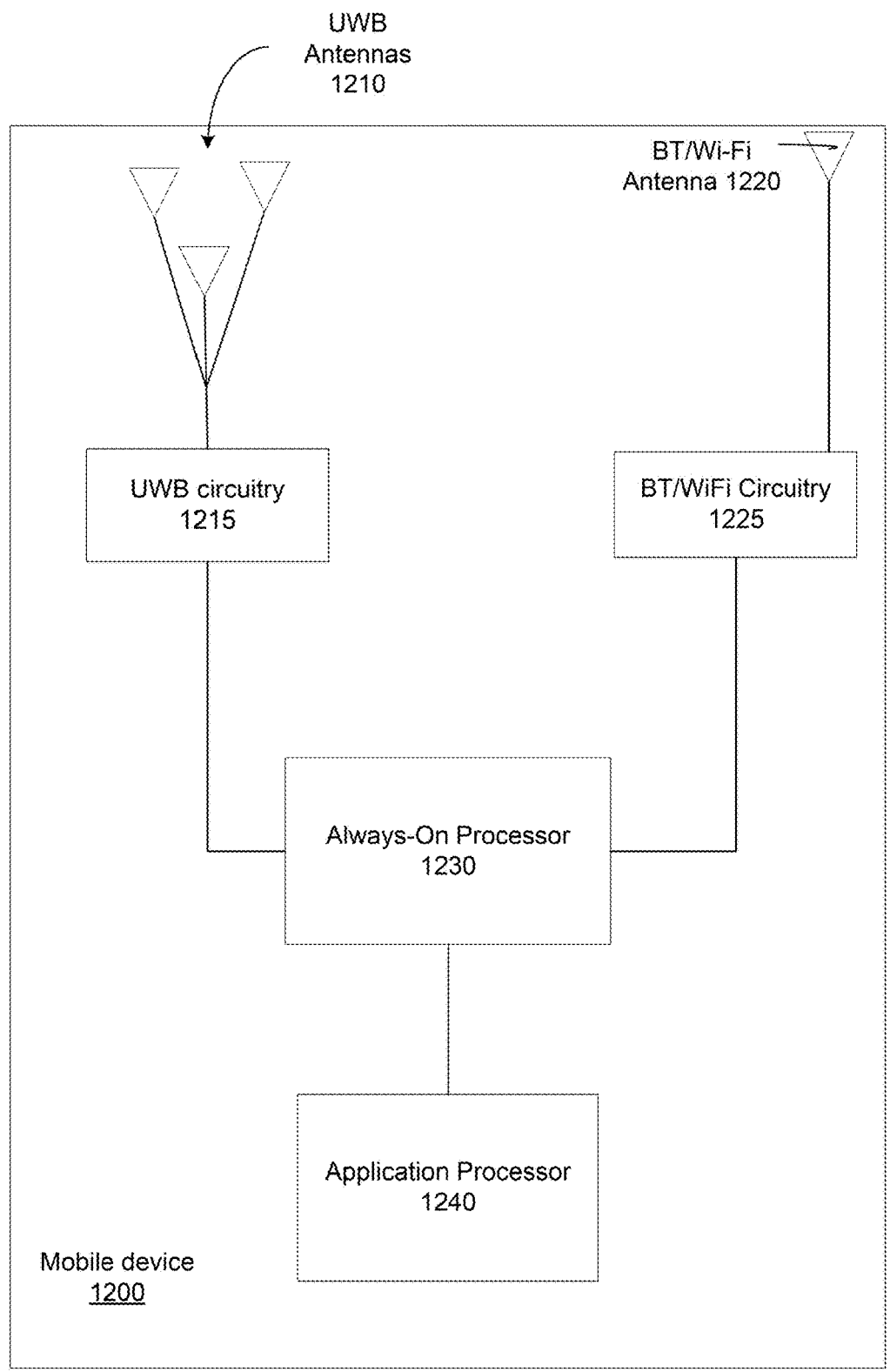
FIG. 12 is a block diagram of components of a mobile device operable to perform ranging according to embodiments of the present disclosure.

FIG. 12 is a block diagram of components of a mobile device 1200 operable to perform ranging according to embodiments of the present disclosure. Mobile device 1200 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1200 includes UWB antennas 1210 for performing ranging. UWB antennas 1210 are connected to UWB circuitry 1215 for analyzing detected messages from UWB antennas 1210. In some embodiments, mobile device 1200 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1215 can communicate with an always-on processor (AOP) 1230, which can perform further processing using information from UWB messages. For example, AOP 1230 can perform the ranging calculations using timing data provided by UWB circuitry 1215. AOP 1230 and other circuits of the device can include dedicated circuitry and/or configurable circuitry, e.g., via firmware or other software.

As shown, mobile device 1200 also includes Bluetooth (BT)/Wi-Fi antenna 1220 for communicating data with other devices. BT/Wi-Fi antenna 1220 is connected to BT/Wi-Fi circuitry 1225 for analyzing detected messages from BT/Wi-Fi antenna 1220. For example, BT/Wi-Fi circuitry 1225 can parse messages to obtain data (e.g., an authentication tag), which can be sent on to AOP 1230. In some embodiments, AOP 1230 can perform authentication using an authentication tag. Thus, AOP 1230 can store or retrieve a list of authentication tags for which to compare a received tag against, as part of an authentication process. In some implementations, such functionality could be achieved by BT/Wi-Fi circuitry 1225.

In other embodiments, UWB circuitry 1215 and BT/Wi-Fi circuitry 1225 can alternatively or in addition be connected to application processor 1240, which can perform similar functionality as AOP 1230. Application processor 1240 typically requires more power than AOP 1230, and thus power can be saved by AOP 1230 handling certain functionality, so that application processor 1240 can remain in a sleep state, e.g., an off state. As an example, application processor 1240 can be used for communicating audio or video using BT/Wi-Fi, while AOP 1230 can coordinate transmission of such content and communication between UWB circuitry 1215 and BT/Wi-Fi circuitry 1225. For instance, AOP 1230 can coordinate timing of UWB messages relative to BT advertisements.

To perform ranging, BT/Wi-Fi circuitry 1225 can analyze an advertisement message from another device to determine that the other device wants to perform ranging, e.g., as part of a process for sharing content. BT/Wi-Fi circuitry 1225 can communicate this notification to AOP 1230, which can schedule UWB circuitry 1215 to be ready to detect UWB messages from the other device.

For the device initiating ranging, its AOP can perform the ranging calculations. Further, the AOP can monitor changes in distance between the other devices. For example, AOP 1230 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VIII. Example Device

Figure 13:
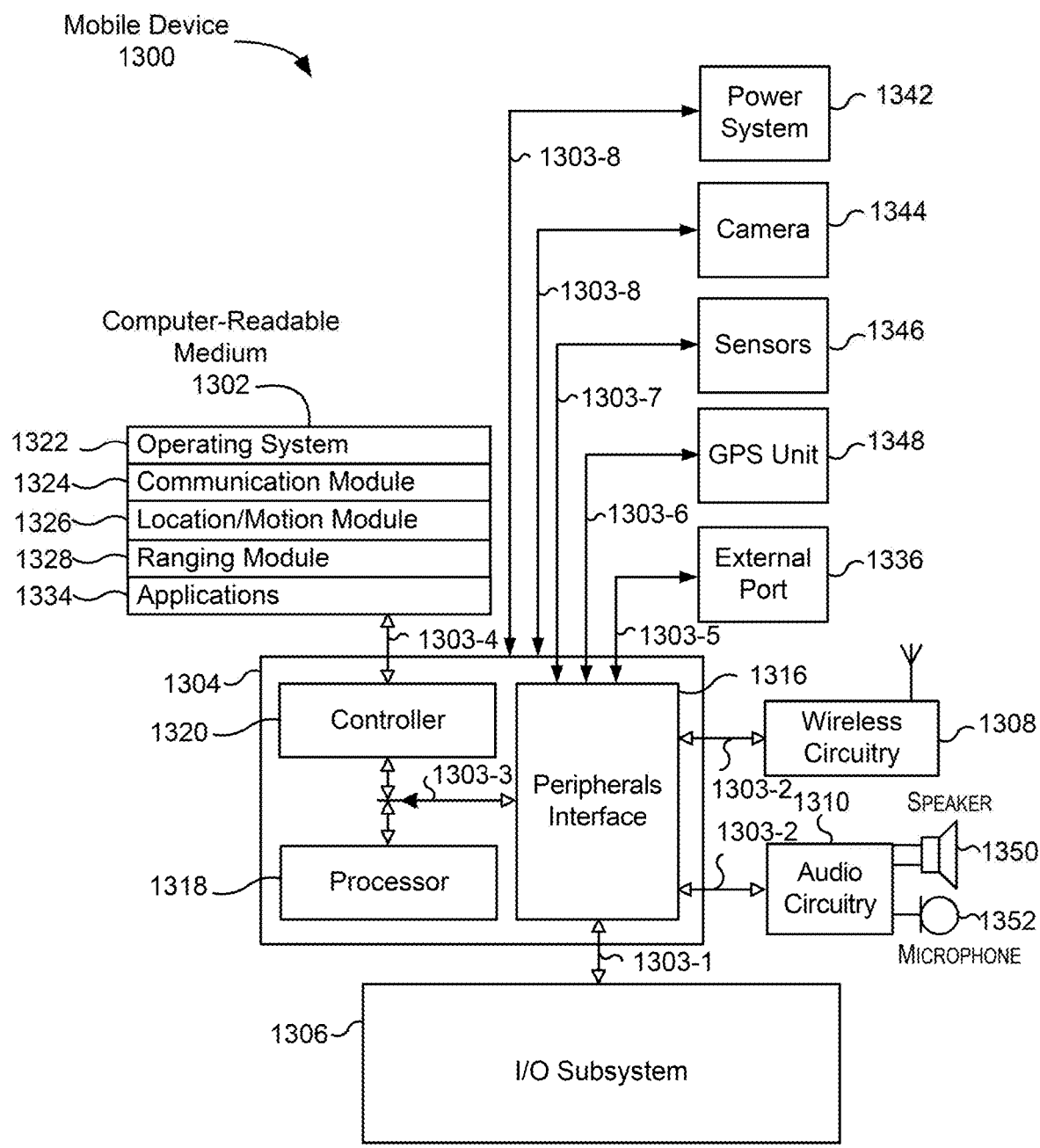
FIG. 13 is block diagram of an example device according to embodiments of the present disclosure.

FIG. 13 is a block diagram of an example electronic device 1300. Device 1300 generally includes computer-readable medium 1302, a processing system 1304, an Input/Output (I/O) subsystem 1306, wireless circuitry 1308, and audio circuitry 1310 including speaker 1312 and microphone 1314. These components may be coupled by one or more communication buses or signal lines 1303. Device 1300 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 13 is only one example of an architecture for device 1300, and that device 1300 can have more or fewer components than shown, or a different configuration of components. The various components shown in FIG. 13 can be implemented in hardware, software, or a combination of both hardware and software, including one or more signal processing and/or application specific integrated circuits.

Wireless circuitry 1308 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 1308 can use various protocols, e.g., as described herein. In various embodiments, wireless circuitry 1308 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1308 is coupled to processing system 1304 via peripherals interface 1316. Peripherals interface 1316 can include conventional components for establishing and maintaining communication between peripherals and processing system 1304. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on medium 1302.

Peripherals interface 1316 couple the input and output peripherals of device 1300 to the one or more processors 1318 and computer-readable medium 1302. One or more processors 1318 communicate with computer-readable medium 1302 via a controller 1320. Computer-readable medium 1302 can be any device or medium that can store code and/or data for use by one or more processors 1318. Computer-readable medium 1302 can include a memory hierarchy, including cache, main memory and secondary memory. The memory hierarchy can be implemented using any combination of a random-access memory (RAM) (e.g., static random access memory (SRAM,) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 1316, one or more processors 1318, and controller 1320 can be implemented on a single chip, such as processing system 1304. In some other embodiments, they can be implemented on separate chips.

Processor(s) 1318 can include hardware and/or software elements that perform one or more processing functions, such as mathematical operations, logical operations, data manipulation operations, data transfer operations, controlling the reception of user input, controlling output of information to users, or the like. Processor(s) 1318 can be embodied as one or more hardware processors, microprocessors, microcontrollers, field programmable gate arrays (FPGAs), application-specified integrated circuits (ASICs), or the like.

Device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1300 includes a camera 1344. In some embodiments, device 1300 includes sensors 1346. Sensors can include accelerometers, compass, gyrometer, pressure sensors, audio sensors, light sensors, barometers, and the like. Sensors 1346 can be used to sense location aspects, such as auditory or light signatures of a location.

In some embodiments, device 1300 can include a GPS receiver, sometimes referred to as a GPS unit 1348. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1318 run various software components stored in medium 1302 to perform various functions for device 1300. In some embodiments, the software components include an operating system 1322, a communication module 1324 (or set of instructions), a location module 1326 (or set of instructions), a ranging module 1328 that is used as part of ranging operation described herein, and other application programs 1334 (or set of instructions).

Operating system 1322 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1326 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1326 receives information from which a location fix can be derived, interprets that information, and returns location information, such as geographic coordinates, latitude/longitude, or other location fix data Ranging module 1328 can send/receive ranging messages to/from an antenna, e.g., connected to wireless circuitry 1308. The messages can be used for various purposes, e.g., to identify a sending antenna of a device, determine timestamps of messages to determine a distance of mobile device 1300 from another device. Ranging module 1328 can exist on various processors of the device, e.g., an always-on processor (AOP), a UWB chip, and/or an application processor. For example, parts of ranging module 1328 can determine a distance on an AOP, and another part of the ranging module can interact with a sharing module, e.g., to display a position of the other device on a screen in order for a user to select the other device to share a data item. Ranging module 1328 can also interact with a reminder module that can provide an alert based on a distance from another mobile device.

The one or more applications 1334 on device 1300 can include any applications installed on the device 1300, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1306 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or trackpad. In some embodiments, I/O subsystem 1306 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1306 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1300 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All references, including publications, patent applications, and patents, cited herein are hereby incorporated by reference to the same extent as if each reference were individually and specifically indicated to be incorporated by reference and were set forth in its entirety herein.

What is claimed is:

1. A method for routing streaming data on a mobile device, the method comprising:
    determining one or more capabilities of one or more playback devices;
    responsive to determining that the one or more capabilities include a ranging capability:
        conducting ranging with one or more playback devices to determine ranging information between the mobile device and each of the one or more playback devices, wherein the one or more playback devices are configured to play streaming data when received from the mobile device, and wherein the ranging information provides at least one of a distance and an orientation between the mobile device and each of the one or more playback devices;
    responsive to determining that the one or more capabilities do not include the ranging capability:
        measuring one or more sensor values at one or more times, the one or more sensor values measured using one or more sensors of the mobile device, wherein the one or more sensor values are determined from one or more signals emitted by corresponding one or more signal sources;
        determining a relative position of the mobile device with respect to the one or more playback devices based on the one or more sensor values;
    detecting a selection of a media item; and
    identifying a particular playback device from the one or more playback devices for playing the media item based on the ranging information or the relative position of the mobile device relative to each of the one or more playback devices.

2. The method of claim 1, wherein the one or more signal sources comprises the one or more playback devices.

3. The method of claim 1, wherein identifying the particular playback device based on the relative position of the mobile device relative to the one or more playback devices comprises:
    generating a cluster map of the one or more sensor values that were measured at one or more physical positions within a location, the cluster map identifying the one or more physical positions and positions of the one or more playback devices at the location;
    determining a plurality of clusters at the location based on the cluster map, wherein each cluster is physically apart at the location; and
    determining a probability of the mobile device being within one of the plurality of clusters based on the relative position and the cluster map.

4. The method of claim 3, further comprising:
    determining a probability of detecting a particular signal of the one or more sensor values at each of the plurality of clusters over a time period; and
    determining if the mobile device is within a particular cluster of the plurality of clusters based in part on the probability.

5. The method of claim 1, further comprising:
    determining an orientation of the mobile device relative to the one or more playback devices; and
    identifying the particular playback device from the one or more playback devices in a list of the one or more playback devices for playing the media item based on the orientation of the mobile device relative to the one or more playback devices.

6. The method of claim 1, further comprising:
    receiving advertising signals from the one or more playback devices, the advertising signals providing information regarding the one or more capabilities of each of the one or more playback devices, wherein the advertising signal includes an authentication tag of the particular playback device of the one or more playback devices, and wherein the information regarding the one or more capabilities indicates whether each of the one or more playback devices includes the ranging capability; and authenticating the particular playback device based at least in part on the authentication tag.

7. The method of claim 6, further comprising displaying, on a screen of the mobile device, an icon corresponding to the particular playback device, wherein the icon is displayed at a location on the screen based on the ranging information or the relative position of the mobile device.

8. The method of claim 1, further comprising:
receiving a gesture on a display of the mobile device; and
identifying the particular playback device from the one or more playback devices in a list of the one or more playback devices for playing the media item based on the received gesture.

9. The method of claim 1, further comprising:
routing information to the particular playback device for playing the media item.

10. The method of claim 1, wherein the relative position is a multi-dimensional data point and wherein the dimensions of the multi-dimensional data point correspond to the ranging information and the one or more sensor values.

11. A computing device, comprising:
one or more memories; and
one or more processors in communication with the one or more memories and configured to execute instructions stored in the one or more memories to perform operations comprising:
determine one or more capabilities of one or more playback devices;
responsive to determining that the one or more capabilities include a ranging capability:
conducting ranging with one or more playback devices to determine ranging information between the computing device and each of the one or more playback devices, wherein the one or more playback devices are configured to play streaming data when received from the computing device, and wherein the ranging information provides at least one of a distance and an orientation between the computing device and each of the one or more playback devices;
responsive to determining that the one or more capabilities do not include the ranging capability:
measuring one or more sensor values at one or more times, the one or more sensor values measured using one or more sensors of the computing device, wherein the one or more sensor values are determined from one or more signals emitted by corresponding one or more signal sources;
determining a relative position of the computing device with respect to the one or more playback devices based on the one or more sensor values;
detecting a selection of a media item; and
identifying a particular playback device from the one or more playback devices for playing the media item based on the ranging information or the relative position of the computing device relative to each of the one or more playback devices.

12. The computing device of claim 11, wherein the one or more signal sources comprises the one or more playback devices.

13. The computing device of claim 12, wherein identifying the particular playback device based on the relative position of the computing device relative to the one or more playback devices comprises:

generating a cluster map of the one or more sensor values that were measured at one or more physical positions within a location, the cluster map identifying the one or more physical positions and positions of the one or more playback devices at the location;
determining a plurality of clusters at the location based on the cluster map, wherein each cluster is physically apart at the location; and
determining a probability of the computing device being within one of the plurality of clusters based on relative position and the cluster map.

14. The computing device of claim 13, wherein the operations further comprise:
determining a probability of detecting a particular signal of the one or more sensor values at each of the plurality of clusters over a time-period; and
determining if the computing device is within a particular cluster of the plurality of clusters based in part on the probability.

15. The computing device of claim 11, wherein the operations further comprise:
determining an orientation of the computing device relative to the one or more playback devices; and
identifying the particular playback device from the one or more playback devices in a list of the one or more playback devices for playing the media item based on the orientation of the computing device relative to the one or more playback devices.

16. The computing device of claim 11, wherein the operations to determine the one or more capabilities of the one or more playback devices further comprise:
receiving advertising signals from the one or more playback devices, the advertising signals providing information regarding the capabilities of each of the one or more playback devices, wherein the advertising signal includes an authentication tag of the particular playback device of the one or more playback devices, and wherein the information regarding the capabilities indicates whether each of the one or more playback devices includes the ranging capability; and
authenticating the particular playback device based at least in part on the authentication tag.

17. The computing device of claim 16, further comprising displaying, on a screen of the computing device, an icon corresponding to the particular playback device, wherein the icon is displayed at a location on the screen based on the ranging information or the relative position of the computing device.

18. The computing device of claim 17, wherein the operations further comprise:
receiving a gesture on a display of the computing device; and
identifying the particular playback device from the one or more playback devices in a list of the one or more playback devices for playing the media item based on the received gesture.

19. A non-transitory computer-readable medium storing a plurality of instructions that, when executed by one or more processors of a computing device, cause the one or more processors to perform operations comprising:
determine one or more capabilities of one or more playback devices;
responsive to determining that the one or more capabilities include a ranging capability:
conducting ranging with one or more playback devices to determine ranging information between the computing device and each of the one or more playback devices, wherein the one or more playback devices are configured to play streaming data when received from the computing device, and wherein the ranging information provides at least one of a distance and an orientation between the computing device and each of the one or more playback devices;

responsive to determining that the one or more capabilities do not include the ranging capability:

measuring one or more sensor values at one or more times, the one or more sensor values measured using one or more sensors of the computing device, wherein the one or more sensor values are determined from one or more signals emitted by corresponding one or more signal sources;

determining a relative position of the computing device with respect to the one or more playback devices based on the one or more sensor values;

detecting a selection of a media item; and identifying a particular playback device from the one or more playback devices for playing the media item based on the ranging information or the relative position of the computing device relative to each of the one or more playback devices.

20. The non-transitory computer-readable medium of claim 19, wherein identifying the particular playback device based on the relative position of the computing device relative to the one or more playback devices comprises:

generating a cluster map of one or more sensor values that were measured at one or more physical positions within a location, the cluster map identifying the one or more physical positions and positions of the one or more playback devices at the location;

determining a plurality of clusters at the location based on the cluster map, wherein each cluster is physically apart at the location; and determining a probability of the computing device being within one of the plurality of clusters based on the relative position and the cluster map.

21. The non-transitory computer-readable medium of claim 20, wherein the operations further comprise:

determining a probability of detecting a particular signal of the one or more sensor values at each of the plurality of clusters over a time-period; and determining if the computing device is within a particular cluster of the plurality of clusters based in part on the probability.

22. The non-transitory computer-readable medium of claim 19, wherein the operations further comprise:

determining an orientation of the computing device relative to the one or more playback devices; and identifying the particular playback device from the one or more playback devices in a list of the one or more playback devices for playing the media item based on the orientation of the computing device relative to the one or more playback devices.

23. The non-transitory computer-readable medium of claim 19, wherein the operations to determine the one or more capabilities of the one or more playback devices further comprise:

receiving advertising signals from the one or more playback devices, the advertising signals providing information regarding capabilities of each of the one or more playback devices, wherein the advertising signal includes an authentication tag of the particular playback device of the one or more playback devices, and wherein the information regarding the capabilities indicates whether each of the one or more playback devices includes a ranging capability; and authenticating the particular playback device based at least in part on the authentication tag.

24. The non-transitory computer-readable medium of claim 23, further comprising displaying, on a screen of the computing device, an icon corresponding to the particular playback device, wherein the icon is displayed at a location on the screen based on the ranging information or the relative position of the computing device.

* * * * *